(12) United States Patent
Nishino et al.

(10) Patent No.: US 9,927,026 B2
(45) Date of Patent: Mar. 27, 2018

(54) HYDROSTATIC CONTINUOUSLY VARIABLE TRANSMISSION

(71) Applicant: Kubota Corporation, Osaka-shi (JP)

(72) Inventors: Akifumi Nishino, Sakai (JP); Ryo Masuda, Sakai (JP)

(73) Assignee: Kubota Corporation, Osaka (JP)

( * ) Notice: Subject to any disclaimer, the term of this patent is extended or adjusted under 35 U.S.C. 154(b) by 364 days.

(21) Appl. No.: 14/662,279

(22) Filed: Mar. 19, 2015

(65) Prior Publication Data

US 2016/0025216 A1 Jan. 28, 2016

(30) Foreign Application Priority Data

Jul. 24, 2014 (JP) .................................. 2014-150970
Feb. 12, 2015 (JP) .................................. 2015-025458

(51) Int. Cl.
*F16H 61/439* (2010.01)
*F16H 61/437* (2010.01)
*F16H 59/02* (2006.01)

(52) U.S. Cl.
CPC ......... *F16H 61/439* (2013.01); *F16H 61/437* (2013.01); *B60Y 2200/221* (2013.01); *F16H 2059/0234* (2013.01)

(58) Field of Classification Search
CPC .................................................... F16H 61/439
See application file for complete search history.

(56) References Cited

U.S. PATENT DOCUMENTS

| | | | |
|---|---|---|---|
| 8,113,080 B2* | 2/2012 | Nishino | E02F 9/2004 |
| | | | 74/473.16 |
| 8,220,582 B2* | 7/2012 | Toyokawa | F16H 59/06 |
| | | | 180/336 |
| 2012/0024100 A1* | 2/2012 | Nishino | F16H 61/439 |
| | | | 74/473.16 |

FOREIGN PATENT DOCUMENTS

JP 469129 Y1 4/1971
JP 2011-152823 A 8/2011

* cited by examiner

*Primary Examiner* — F. Daniel Lopez
(74) *Attorney, Agent, or Firm* — The Webb Law Firm

(57) ABSTRACT

A neutral biasing mechanism in a hydrostatic continuously variable transmission includes a plurality of springs attached so as to be spanned from a pivot arm to a base. The plurality of springs bias the pivot arm such that a roller is fitted into a cam portion. A variable spring configured such that a biasing force thereof can be changed and another spring that is different from the variable spring are provided as the plurality of springs. The variable spring and the other spring are arranged at separate positions in a state where attachment positions thereof in the pivot arm and the base are separate from each other.

4 Claims, 13 Drawing Sheets

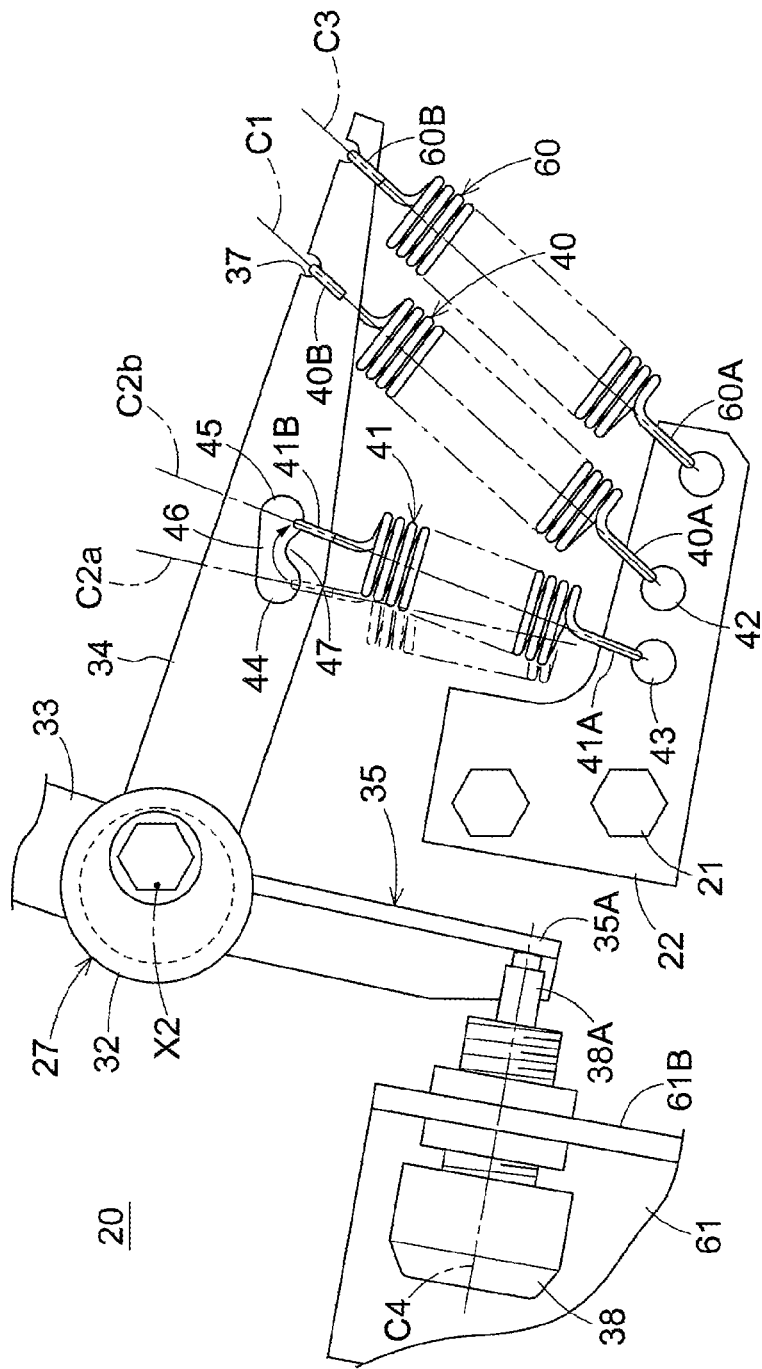

ic continuously variable transmission including: a neutral biasing mechanism that can change an angle of a swash plate by performing an operation of pivoting a trunnion shaft, and that biases the swash plate to a neutral position, the neutral biasing mechanism including: a cam member that is integrally attached to the trunnion shaft and has a cam portion formed so as to recede toward the trunnion shaft side; a pivot arm that pivots around a rocking shaft parallel with the trunnion shaft; a roller that is rotatably supported by the pivot arm, and pivots the cam member so as to be set at a neutral posture corresponding to the neutral position, by being fitted into the cam portion; and a plurality of springs that are attached so as to be spanned from the pivot arm to the base and bias the pivot arm such that the roller is fitted into the cam portion, wherein a variable spring configured such that a biasing force thereof can be changed and another spring that is different from the variable spring are provided as the plurality of springs, and wherein the variable spring and the other spring are arranged at separate positions in a state where attachment positions thereof in the pivot arm and the base are separate from each other.

HYDROSTATIC CONTINUOUSLY VARIABLE TRANSMISSION

CROSS-REFERENCE TO RELATED APPLICATIONS

This application claims priority to Japanese Patent Application Nos. 2014-150970 and 2015-025458, filed Jul. 24, 2014 and Feb. 12, 2015, respectively, the disclosures of which are hereby incorporated in their entirety by reference.

BACKGROUND OF THE INVENTION

Field of the Invention

The present invention relates to a hydrostatic continuously variable transmission including a neutral biasing mechanism that can change an angle of a swash plate by performing an operation of pivoting a trunnion shaft, and that biases the swash plate to a neutral position.

Description of the Related Art

For example, JP 2011-152823A describes a conventional hydrostatic continuously variable transmission. The hydrostatic continuously variable transmission described in this publication includes a cam member (in this publication, a "cam plate") in a neutral biasing mechanism, the cam member being integrally attached to a trunnion shaft and has a cam portion (in this publication, a "cam recess portion") formed so as to recede toward the trunnion shaft side. Furthermore, this neutral biasing mechanism includes a pivot arm (in this publication, an "L-shaped arm) that pivots around a rocking shaft parallel with the trunnion shaft, and a roller that is rotatably supported by the pivot arm and pivots the cam member to a neutral posture corresponding to the neutral position by being fitted into the cam portion.

Furthermore, the neutral biasing mechanism includes a single spring that is attached so as to be spanned from the pivot arm to a base and biases the pivot arm such that the roller is fitted into the cam portion.

Incidentally, in the hydrostatic continuously variable transmission, there are cases where biasing force of the neutral biasing mechanism decreases as a result of the spring undergoing plastic deformation after being used for years, for example.

In such cases, the biasing force of the neutral biasing mechanism becomes smaller than the force necessary for restoring the swash plate to the neutral position, and the swash plate is then difficult to be restored to the neutral position, resulting in inconvenience.

In the conventional neutral biasing mechanism, the swash plate is biased to the neutral position by only the biasing force of a single spring that is attached to a fixed position. Accordingly, in order to change the biasing force of the neutral biasing mechanism, the single spring needs to be replaced, which requires time and effort. Moreover, since the spring is replaced, the biasing force cannot be finely adjusted, and therefore many kinds of springs need to be prepared.

In view of the foregoing situation, provision of a hydrostatic continuously variable transmission has been desired that can easily change the biasing force of the neutral biasing mechanism for restoring the swash plate to the neutral position, with a simple structure.

SUMMARY OF THE INVENTION

A hydrostatic continuously variable transmission in the present invention is a hydrostatic continuously variable According to an aspect of the present invention, the neutral biasing mechanism includes the variable spring whose biasing force can be changed. Accordingly, even if the swash plate enters a state of being difficult to be restored to the neutral position, the biasing force of the neutral biasing mechanism can be easily changed only by changing the biasing force of the variable spring, without replacing the spring.

Furthermore, since the variable spring and the other spring are arranged at separate portions, a wide space is secured around the variable spring, and an adjustment operation for the variable spring can be smoothly performed. In addition, interference between the variable spring and the other spring is unlikely to occur, and the inconvenience of the springs being entwined with each other can be avoided.

Thus, according to the present invention, the biasing force of the neutral biasing mechanism for restoring the swash plate to the neutral position can be easily changed with a simple structure.

In the above configuration, it is preferable that only one spring is provided as the other spring, and a biasing force of the variable spring to be applied to the pivot arm is set smaller than a biasing force of the other spring to be applied to the pivot arm.

With this configuration, since the biasing force of the variable spring is smaller than the biasing force of the other single spring, and accordingly an adjustment operation for changing the biasing force of the adjustment spring can be easily performed.

In the above configuration, it is preferable that the pivot arm includes a main arm portion and a sub-arm portion extending in a direction different from an extending direction of the main arm portion, the variable spring is attached to one of the main arm portion and the sub-arm portion, and the other spring is attached to the other one of the main arm portion and the sub-arm portion.

With this configuration, the attachment positions of the variable spring and the other single spring with respect to the pivot arm can be greatly separated from each other, while arranging the variable spring and the other single spring in a distributed manner in a space near the main arm portion and a space near the sub-arm portion extending in a direction different from the extending direction of the main arm portion, respectively. The adjustment operation for the variable spring can thereby be more easily performed, and interference between the variable spring and the other single spring is more unlikely to occur.

In the above configuration, it is preferable that an extending direction of the variable spring and an extending direction of the other spring are configured to be substantially orthogonal to each other.

With this configuration, when performing the adjustment operation for the variable spring, the single other spring whose extending direction is orthogonal to that of the variable spring is unlikely to hinder the operation for the variable spring, and interference between the springs is preferably suppressed.

In the above configuration, it is preferable that two or more springs are provided as the other spring, and a biasing force of the variable spring to be applied to the pivot arm is set smaller than a total of biasing forces of the other springs to be applied to the pivot arm.

With this configuration, since the biasing force of the variable spring is smaller than the total of the biasing forces of the other two or more springs, the adjustment operation for changing the biasing force of the adjustment spring can be easily performed.

In the above configuration, it is preferable that the pivot arm includes a main arm portion and a sub-arm portion extending in a direction different from an extending direction of the main arm portion, the variable spring is attached to one of the main arm portion and the sub-arm portion, and at least one of the other springs is attached to the other one of the main arm portion and the sub-arm portion.

With this configuration, the attachment positions of the variable spring and at least one of the plurality of other springs with respect to the pivot arm can be greatly separated from each other, while arranging the variable spring and the at least one of the plurality of other springs in a distributed manner in a space near the main arm portion and a space near the sub-arm portion extending in a direction different from the extending direction of the main arm portion, respectively. The adjustment operation for the variable spring can thereby be more easily performed, and interference between the variable spring and the at least one of the plurality of other springs is more unlikely to occur.

In the above configuration, it is preferable that an extending direction of the variable spring and an extending direction of the at least one of the other springs attached to the other one of the main arm portion and the sub-arm portion are configured to be substantially orthogonal to each other.

With this configuration, when performing the adjustment operation for the variable spring, at least one of the plurality of other springs whose extending direction is orthogonal to that of the variable spring is unlikely to hinder the operation for the variable spring, and interference between the springs is preferably suppressed.

In the above configuration, it is preferable that a plurality of attachment holes to which an attachment portion of the variable spring is selectively attached is formed in one of the pivot arm and the base, positions of the plurality of attachment holes are set such that, in a state where the attachment portion is attached thereto, moments exerted on the pivot arm based on the biasing force of the variable spring are different, and the plurality of attachment holes are in communication with each other such that the attachment portion can move therebetween, and a holding means for holding the attachment portion at each of the attachment holes is provided.

With this configuration, the strength of the moment exerted on the pivot arm from the variable spring is changed by selecting, from among the plurality of attachment holes, an attachment hole to which the attachment portion of the variable spring is to be attached, and the biasing force for biasing the swash plate to the neutral position is thereby changed. The attachment portion of the variable spring is attached, not to an opening portion such as a cutout portion, but to an attachment hole, and is held at the attachment hole by the holding means. Accordingly, the variable spring is unlikely to withdraw. Moreover, since the plurality of attachment holes are in communication with each other, the attachment position of the variable spring can be easily shifted to move from the attachment hole to which the variable spring is currently attached to the attachment hole to which the variable spring is moved from the current attachment hole, without detaching the variable spring. Accordingly, the biasing force of the neutral biasing mechanism can be changed with a simple operation.

In the above configuration, it is preferable that two or more springs are provided as the other spring, the pivot arm includes a main arm portion and a sub-arm portion extending in a direction different from an extending direction of the main arm portion, the variable spring is attached to one of the main arm portion and the sub-arm portion, and at least one of the other springs is attached to the other one of the main arm portion and the sub-arm portion.

With this configuration, the attachment positions of the variable spring and at least one of the plurality of other springs with respect to the pivot arm can be greatly separated from each other, while arranging the variable spring and the at least one of the plurality of other springs in a distributed manner in a space near the main arm portion and a space near the sub-arm portion extending in a direction different from the extending direction of the main arm portion, respectively. The adjustment operation for the variable spring can thereby be more easily performed, and interference between the variable spring and the at least one of the plurality of other springs is more unlikely to occur.

In the above configuration, it is preferable that an extending direction of the variable spring and an extending direction of the at least one of the other springs attached to the other one of the main arm portion and the sub-arm portion are configured to be substantially orthogonal to each other.

With this configuration, when performing the adjustment operation for the variable spring, at least one of the plurality of other springs whose extending direction is orthogonal to that of the variable spring is unlikely to hinder the operation for the variable spring, and interference between the springs is preferably suppressed.

BRIEF DESCRIPTION OF THE DRAWINGS

FIG. 17 shows another embodiment, and is a right side view showing a main part of a neutral biasing mechanism.

DETAILED DESCRIPTION OF THE PREFERRED EMBODIMENTS

First Embodiment

A first embodiment, which is an example of the present invention, will be described below based on the drawings.

For example, a hydrostatic continuously variable transmission S is provided in a tractor T, which serves as an example of a working vehicle.

[Regarding Basic Configuration of Tractor]

Figure 1:
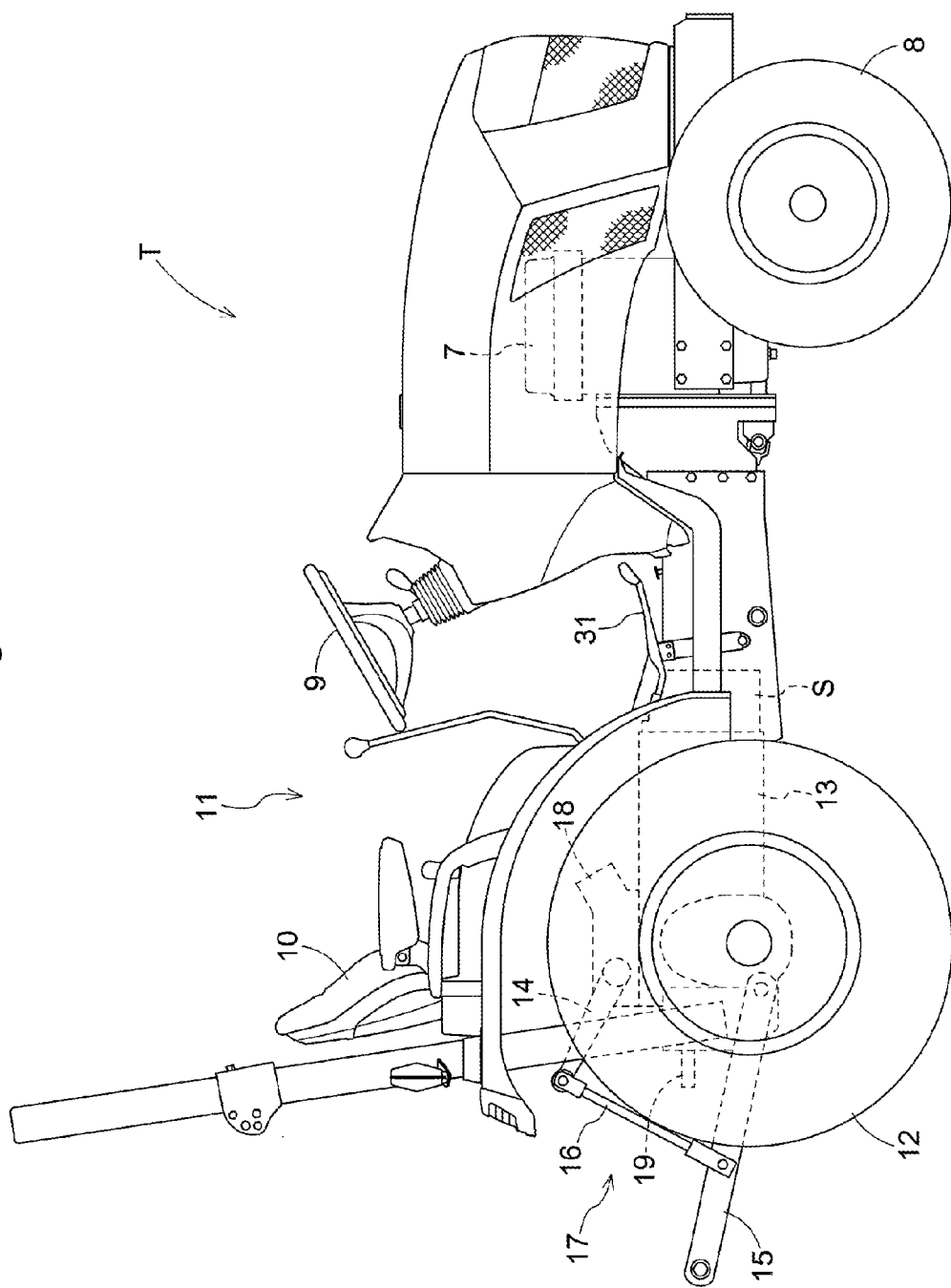
FIG. 1 shows a first embodiment, and is a right side view of a tractor.
Figure 2:
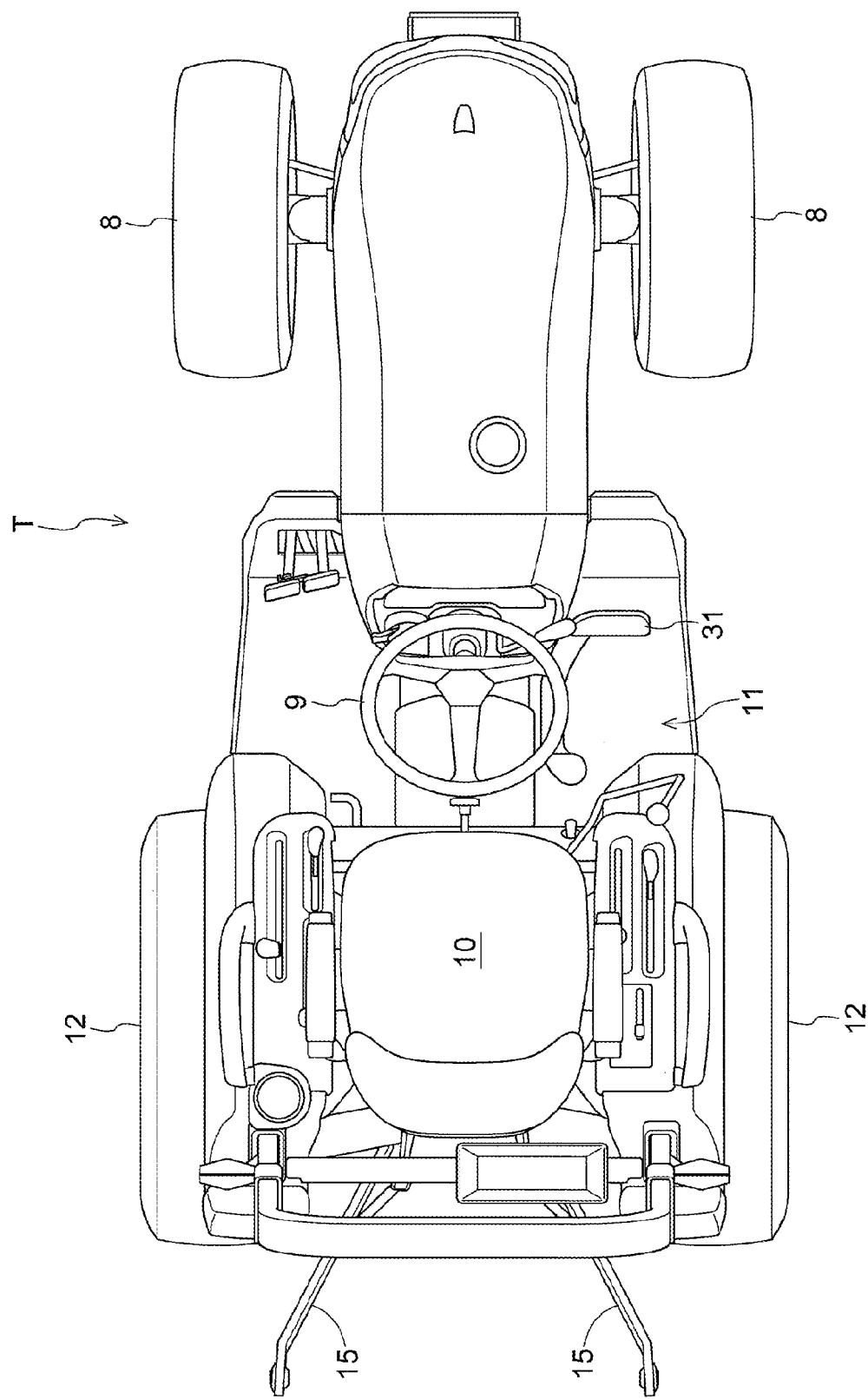
FIG. 2 shows the first embodiment, and is a plan view of the tractor.

As shown in FIGS. 1 and 2, in a front part of a travelling body of the tractor T, an engine 7 and the like are provided, and a pair of left and right front wheels 8 driven by the power from the engine 7 are also provided so as to be able to be steered. In a rear part of the travelling body of the tractor T, a boarding/driving section 11 is formed that includes a steering wheel 9 associated with the left and right front wheels 8, a driver seat 10, and the like. A pair of left and right rear wheels 12 driven by the power from the engine 7 are provided on the left and right outer sides of the boarding/driving section 11. A transmission case 13 including a gear-type transmission (not shown) functioning as a sub-transmission, and the like, as well as the hydrostatic continuously variable transmission S functioning as a main transmission are provided below the boarding/driving section 11.

As shown in FIG. 1, a link mechanism 17 constituted by left and right lifting arms 14, left and right lower links 15, lift rods 16 connecting the lifting arms 14 to the lower links 15, and the like, a hydraulic cylinder 18 for rocking the link mechanism 17 up and down, and a power output shaft 19 are provided in a rear part of the transmission case 13. The tractor T is thereby configured so as to be able to lift and lower a working machine such as a rotary cultivation machine or a plough and to output the power from the power output shaft 19, in the rear part of the tractor T.

Figure 3:
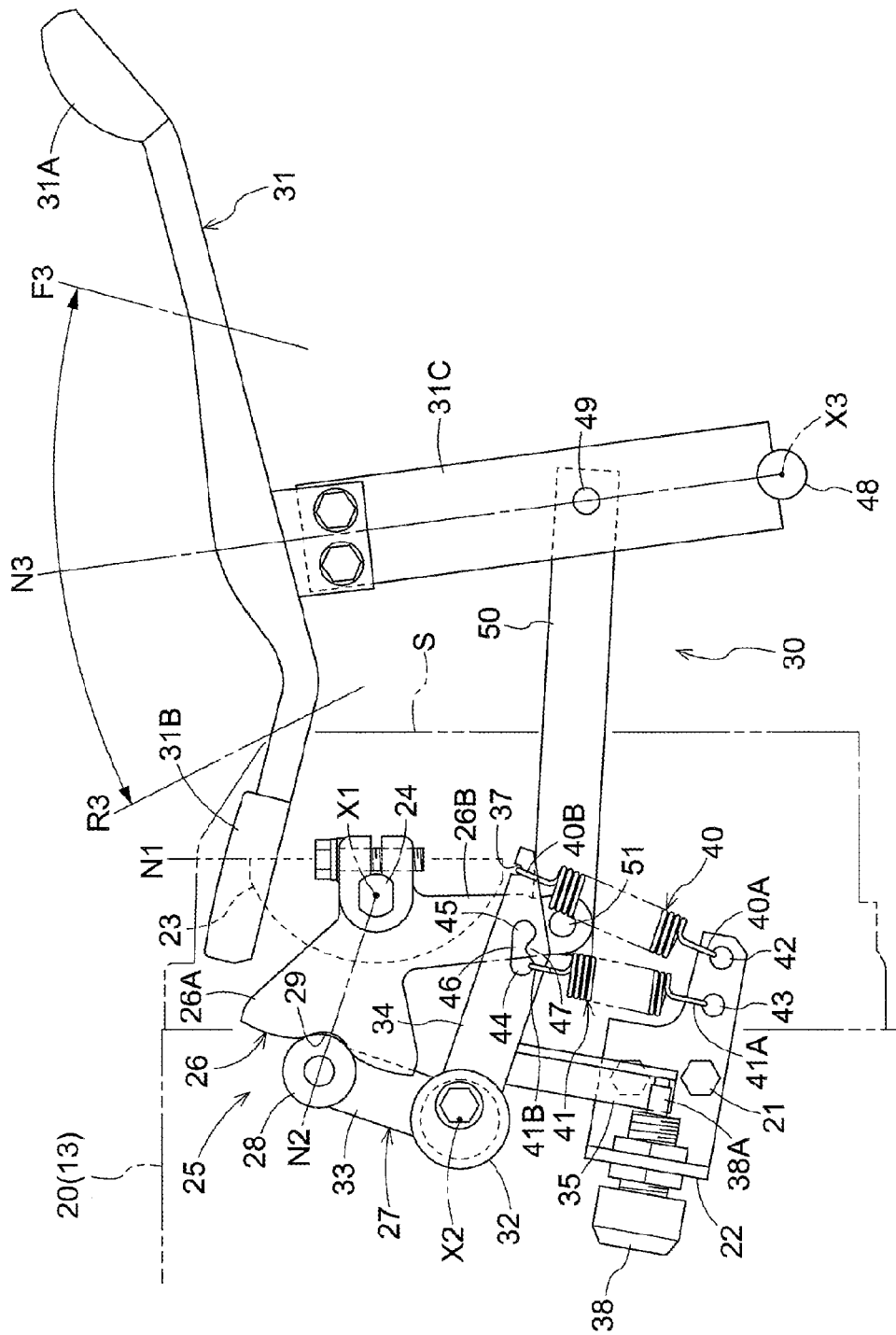
FIG. 3 shows the first embodiment, and is a right side view showing the periphery of a neutral biasing mechanism in a state where a swash plate is at a neutral position.
Figure 4:
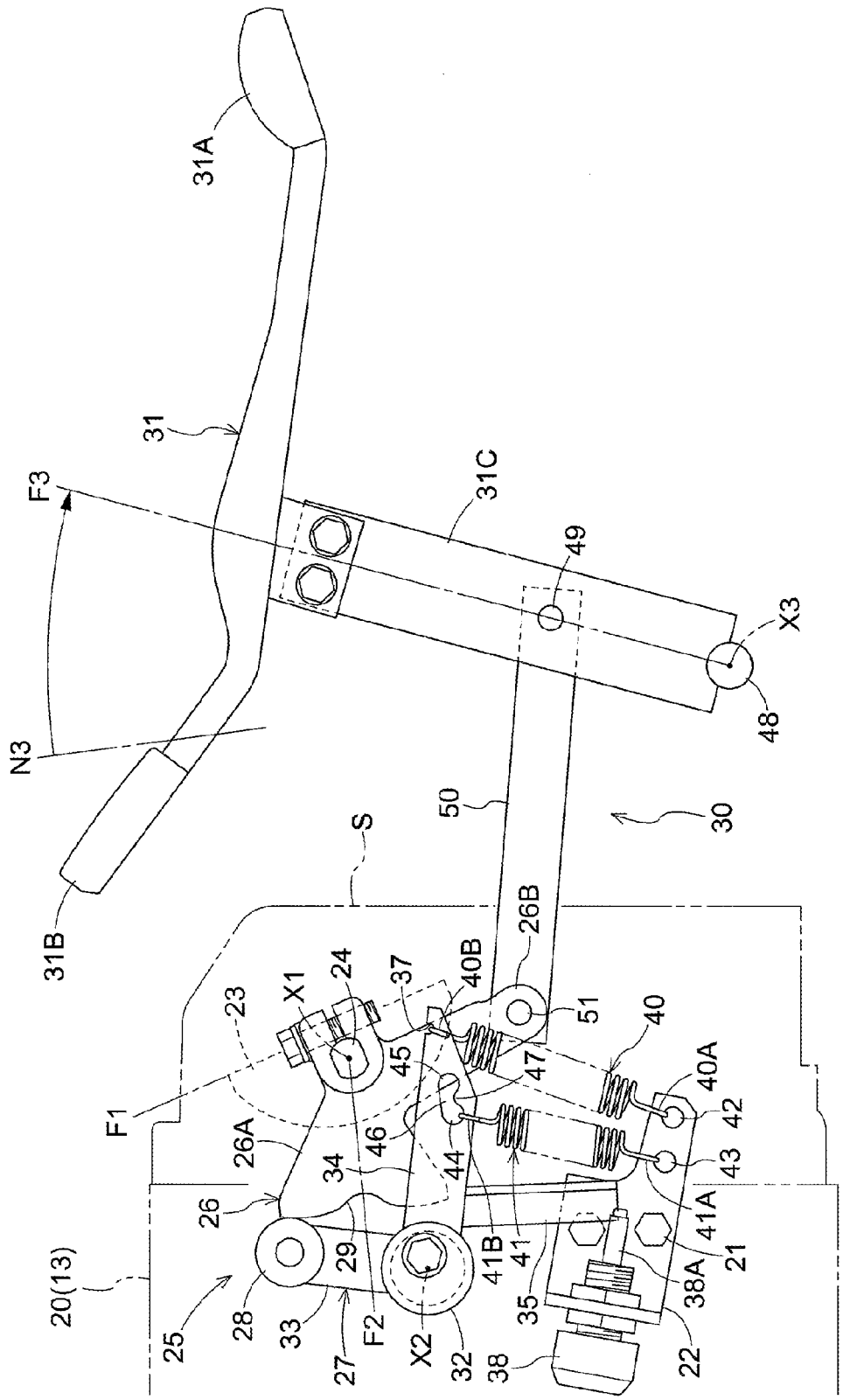
FIG. 4 shows the first embodiment, and is a right side view showing the periphery of the neutral biasing mechanism in a state where the swash plate is at a maximum forward rotation position.
Figure 5:
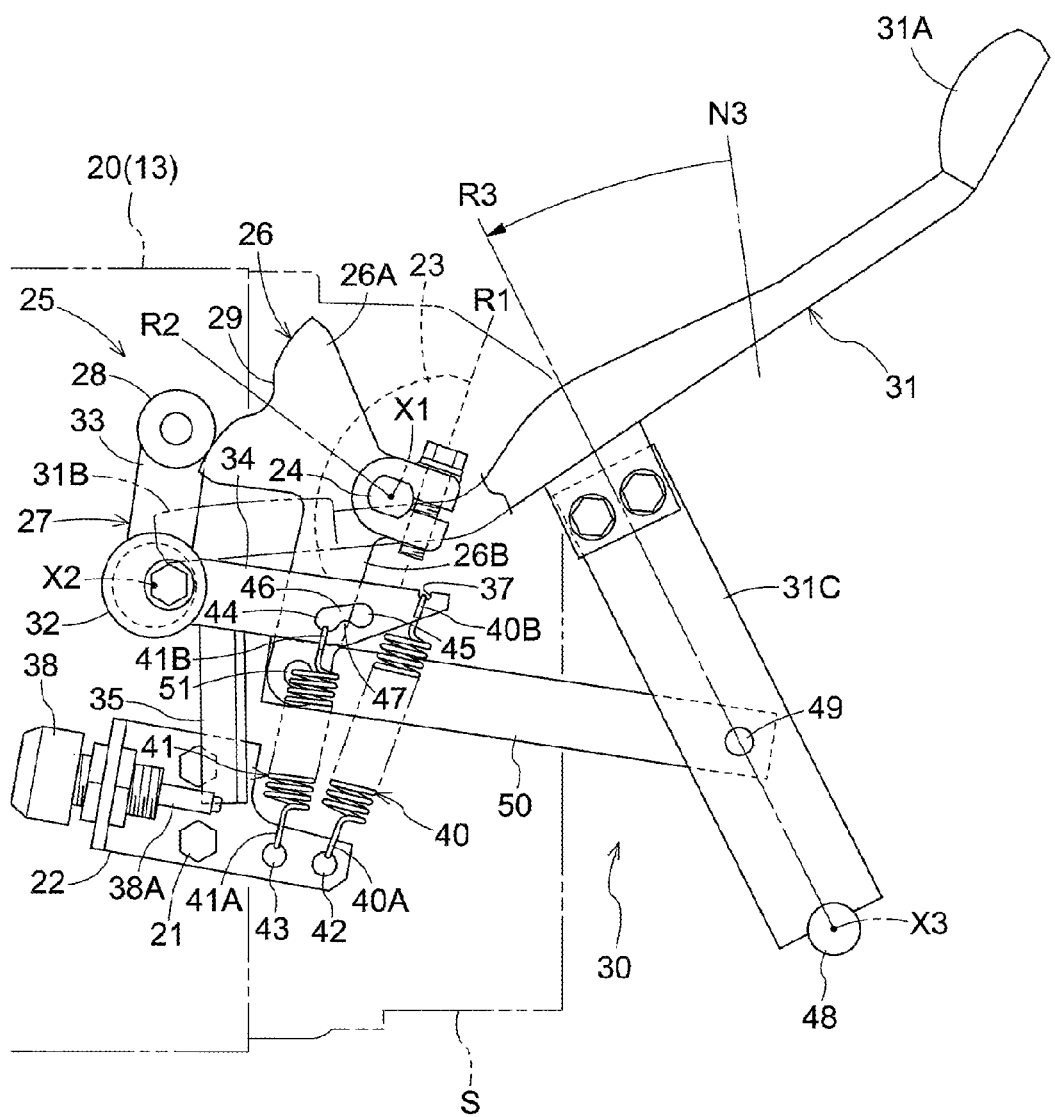
FIG. 5 shows the first embodiment, and is a right side view showing the periphery of the neutral biasing mechanism in a state where the swash plate is at a maximum reverse rotation position.

As shown in FIGS. 3 to 5, a base 20 serving as a member for attachment that is a plate-like member, for example, is provided in a fixed manner on the side of a right side portion of the body of the transmission case 13. A fixation bracket 22 is provided so as to be fixed by fastening using a fastening tool such as a bolt 21, for example, in a right side portion of the body of the base 20.

[Regarding Hydrostatic Continuously Variable Transmission]

Although the inside structure is not shown, the hydrostatic continuously variable transmission S includes an axial plunger hydraulic pump that is driven by the engine 7 and is configured to be of a variable displacement type, and an axial plunger hydraulic motor that rotates at a speed corresponding to the amount of hydraulic fluid by the hydraulic fluid being supplied from the aforementioned hydraulic pump. This hydraulic pump is configured to transmit travelling driving force to the transmission case 13.

As shown in FIGS. 3 to 5, the hydrostatic continuously variable transmission S includes a swash plate 23 of the hydraulic pump, a trunnion shaft 24 that is integrally joined to the swash plate 23 so as to operate together therewith, and a neutral biasing mechanism 25 that biases the swash plate 23 to a neutral position N1 via the trunnion shaft 24. The neutral biasing mechanism 25 of the hydrostatic continuously variable transmission S is configured to be able to change the angle of the swash plate 23 between a maximum forward rotation position F1 and a maximum reverse rotation position R1, the neutral position N1 being located therebetween, by performing an operation of pivoting the trunnion shaft 24 around an operation axis X1.

The output of the hydrostatic continuously variable transmission S is configured to be continuously variable between a maximum forward rotation speed (maximum forward speed) and a maximum reverse rotation speed (maximum rearward speed) with zero speed therebetween. The hydrostatic continuously variable transmission S achieves a zero speed state by setting the swash plate 23 at the neutral position N1, achieves a maximum forward rotation state in which the speed is maximum in a forward rotation direction by setting the swash plate 23 at the maximum forward rotation position F1, and achieves a maximum reverse rotation state in which the speed is maximum in a direction opposite to the forward rotation direction by setting the swash plate 23 at the maximum reverse rotation position R1.

As shown in FIGS. 3 to 5, the trunnion shaft 24 projects rightward of the body of the transmission case 13 from a right side portion of the body thereof. The cross-sectional shape of a right end portion of the trunnion shaft 24 as viewed from the side is formed in an oval shape. The trunnion shaft 24 can be operated so as to pivot around the operation axis X1, which is oriented laterally with respect to the body.

The neutral biasing mechanism 25 applies the biasing force for performing an operation of pivoting the trunnion shaft 24 such that the swash plate 23 is set at the neutral position N1. The neutral biasing mechanism 25 includes a cam member 26, which is a first pivot arm, a pivot arm 27, which is a second pivot arm, a roller 28, and later-described two (a plurality of) springs 40 and 41.

The cam member 26 can change its posture between a maximum forward rotation posture F2 (see FIG. 4) corresponding to the maximum forward rotation position F1 of the swash plate 23 and a maximum reverse rotation posture R2 (see FIG. 5) corresponding to the maximum reverse rotation position R1 of the swash plate 23, with a neutral posture N2 (see FIG. 3) corresponding to the neutral position N1 of the swash plate 23 therebetween, by rocking around the operation axis X1 of the trunnion shaft 24.

As shown in FIGS. 3 to 5, the cam member 26 is integrally attached to the trunnion shaft 24. That is to say, the cam member 26 can rock around the operation axis X1, integrally with the trunnion shaft 24. The cam member 26 includes a fan-shaped portion 26A having a fan-like shape and an operation arm 26B that is integrated with the fan-shaped portion 26A. A cam portion 29 that recedes in a V-shape toward the trunnion shaft 24 side is formed at an edge portion of the fan-shaped portion 26A of the cam member 26. A base end portion of the fan-shaped portion 26A is connected to the trunnion shaft 24 by sandwiching a right end portion of the trunnion shaft 24. As described later, a seesaw-type gear shift pedal 31, which is an example of a gear change operation tool, is associated with the operation arm 26B via an association mechanism 30.

The pivot arm 27 includes a rocking shaft 32 capable of rocking around a pivot axis X2, an exertion arm portion 33, which is a first arm extending toward the cam portion 29 side of the cam member 26 from the rocking shaft 32, a main arm portion 34, which is a second arm extending from the rocking shaft 32 in a direction different from the extending direction of the exertion arm portion 33, and a sub-arm portion 35, which is a detection arm extending in a direction different from the extending directions of the exertion arm portion 33 and the main arm portion 34. The rocking shaft 32, the exertion arm portion 33, the main arm portion 34, and the sub-arm portion 35 are configured to move integrally. The exertion arm portion 33 is extended upward from the rocking shaft 32. The main arm portion 34 is extended frontward from the rocking shaft 32. The sub-arm portion 35 extends downward from a portion near a center portion of the main arm portion 34.

The pivot arm 27 is supported so as to be able to relatively pivot with respect to the base 20 that is fixed to the transmission case 13. The pivot arm 27 is configured to pivot around the pivot axis X2, which is the center of the rocking shaft 32. The pivot axis X2 of the rocking shaft 32 is parallel with the operation axis X1 of the trunnion shaft 24.

The roller 28 is rotatably supported at a free end portion of the exertion arm portion 33 of the pivot arm 27. The roller 28 presses the cam member 26 by being fitted into the cam portion 29, and pivots the cam member 26 toward the neutral posture N2 corresponding to the neutral position N1 of the swash plate 23 (see FIG. 3). Upon the cam member 26 being set at the neutral posture N2, the swash plate 23 that is connected, via the trunnion shaft 24, to the cam member 26 so as to operate together therewith is set at the neutral position N1. More specifically, the cam portion 29 is formed in a curved shape with which the roller 28 comes closest to the operation axis X1 side of the trunnion shaft 24, in a state where the swash plate 23 is at the neutral position N1.

The main arm portion 34 includes a plurality of attachment holes 44 and 45, which will be described later, and a hooking portion 37 having a cutout shape that is located on a free end side of the main arm portion 34, further separately from the pivot axis X2 than the plurality of attachment holes 44 and 45 are. The hooking portion 37 is a cutout portion formed by cutting out downward an edge portion of the main arm portion 34.

As shown in FIGS. 3 to 6, the hydrostatic continuously variable transmission S includes a press switch 38, which is a detection means capable of detecting the neutral position N1 of the swash plate 23. The switch 38 is fixed to the fixation bracket 22 that is fixed to the base 20. The switch 38 outputs a detection signal when a detector 38A is pressed in a pressing direction parallel with a pressure axis. Upon the cam member 26 being set at the neutral posture N2, the detector 38A of the switch 38 is pressed by the sub-arm portion 35 of the cam member 26. The detection signal of the switch 38 is input to a control device (not shown), and is used in various kinds of control.

[Regarding First Non-Variable Spring and Variable Spring]

As shown in FIGS. 3 to 6, the neutral biasing mechanism 25 in the first embodiment includes two springs as a plurality of springs, namely a first non-variable spring 40 (an example of "another spring") configured such that biasing force thereof cannot be changed, and a variable spring 41 serving as an adjustment spring configured such that biasing force thereof can be changed. That is to say, the neutral biasing mechanism 25 in the first embodiment includes, as a plurality of springs 40 and 41, the variable spring 41 configured such that the biasing force thereof can be changed, and an only one first non-variable spring 40 that is different from the variable spring 41.

The spring constant of the variable spring 41 is set smaller than the spring constant of the first non-variable spring 40. That is to say, the biasing force of the variable spring 41 to be applied to the pivot arm 27 is set smaller than the biasing force of the first non-variable spring 40 to be applied to the pivot arm 27.

The first non-variable spring 40 and the variable spring 41 are attached so as to be spanned from the pivot arm 27 to the base 20. The first non-variable spring 40 and the variable spring 41 are configured to bias the pivot arm 27 such that the roller 28 is fitted into the cam portion 29 of the cam member 26. More specifically, the first non-variable spring 40 and the variable spring 41 are configured such that the roller 28 presses the cam portion 29 of the cam member 26 and applies the biasing force for biasing the pivot arm 27 in a direction in which the swash plate 23 is set at the neutral position N1. That is to say, the biasing force with which the neutral biasing mechanism 25 biases the swash plate 23 to the neutral position N1 is based on a combination of the biasing force of the first non-variable spring 40 and the biasing force of the variable spring 41.

As shown in FIGS. 3 to 6, the variable spring 41 and the first non-variable spring 40 are arranged at separate positions in a state where their attachment positions in the pivot arm 27 and the base 20 are separate from each other. That is to say, the first non-variable spring 40 and the variable spring 41 are provided independently in a state where their attachment positions in the pivot arm 27 and the base 20 are separate from each other. The variable spring 41 is located at a position closer to the rocking shaft 32 (pivot axis X2) than the first non-variable spring 40 is. The first non-variable spring 40 and the variable spring 41 are attached so as to be spanned from the main arm portion 34 of the pivot arm 27 to the fixation bracket 22.

The first non-variable spring 40 and the variable spring 41 exert pulling force to the main arm portion 34 of the pivot arm 27, and the pivot arm 27 is thereby biased such that the roller 28 that is rotatably supported by the exertion arm portion 33 of the pivot arm 27 is fitted into the cam portion 29.

The first non-variable spring 40 and the variable spring 41 are tensile springs. The first non-variable spring 40 and the variable spring 41 contract to the maximum when the swash plate 23 is at the neutral position N1 (see FIG. 3), and extend to the maximum when the swash plate 23 is at the maximum forward rotation position F1 or the maximum reverse rotation position R1 (see FIGS. 4 and 5). The first non-variable spring 40 and the variable spring 41 exert pulling force on the pivot arm 27 even in a state where the swash plate 23 is at the neutral position N1. More specifically, in a state where the cam member 26 is set at the neutral posture N2, the first non-variable spring 40 and the variable spring 41 are attached to the pivot arm 27 in a state of being extended to a length larger than their natural lengths.

As shown in FIGS. 3 to 6, the fixation bracket 22 to which the first non-variable spring 40 and the variable spring 41 are attached is provided on the base 20. The fixation bracket 22 is supported by the right side portion of the body of the base 20 while being fixed thereto by a fastening tool such as the bolt 21. The fixation bracket 22 has a first fixation hole 42 having a round hole shape, and a second fixation hole 43, which is an example of a "fixing portion" having a round hole shape that is arranged separately from the first fixation hole 42 side-by-side. The second fixation hole 43 is located at a portion closer to the rocking shaft 32 (pivot axis X2) than the first fixation hole 42 is. The first fixation hole 42 serving as an attachment position of the first non-variable spring 40 is located at a position farther from the rocking shaft 32 (pivot axis X2) than the second fixation hole 43 serving as an attachment position of the variable spring 41 is. That is to say, the first fixation hole 42 and the second fixation hole 43 are in a state of being separate from each other.

A first end 40A of the first non-variable spring 40 is attached to the first fixation hole 42 in a fixable state. A second other end 40B of the first non-variable spring 40 is attached to the hooking portion 37 of the main arm portion 34 in a fixable state. A first end 41A of the variable spring 41 is attached to the second fixation hole 43 in a fixable state. A second end 41B, which corresponds to an "attachment portion", of the variable spring 41 is attached such that its position can be changed. The variable spring 41 is located at a position closer to the rocking shaft 32 (pivot axis X2) than the first non-variable spring 40 is.

[Regarding Attachment Holes]

As shown in FIGS. 3 to 6, a variable structure is provided that enables the biasing force of the variable spring 41 to be changed. Specifically, the pivot arm 27 includes two (a plurality of) attachment holes 44 and 45 to which the variable spring 41 is selectively attached. Specifically, the first attachment hole 44 and the second attachment hole 45 that is located at a position farther from the pivot axis X2 than the first attachment hole 44 is are formed in the main arm portion 34 of the pivot arm 27. The hooking portion 37 serving as an attachment position of the first non-variable spring 40 is located at a position farther from the rocking shaft 32 (pivot axis X2) than the first attachment hole 44 and the second attachment hole 45 serving as attachment positions of the variable spring 41 are. That is to say, the hooking portion 37 and the first and second attachment holes 44 and 45 are in a state of being separate from each other.

The second end 41B of the variable spring 41 can be attached to the first attachment hole 44 and the second attachment hole 45. That is to say, as shown in FIG. 6, the attachment position of the second end 41B of the variable spring 41 can be shifted between the first attachment hole 44 and the second attachment hole 45.

Figure 6:
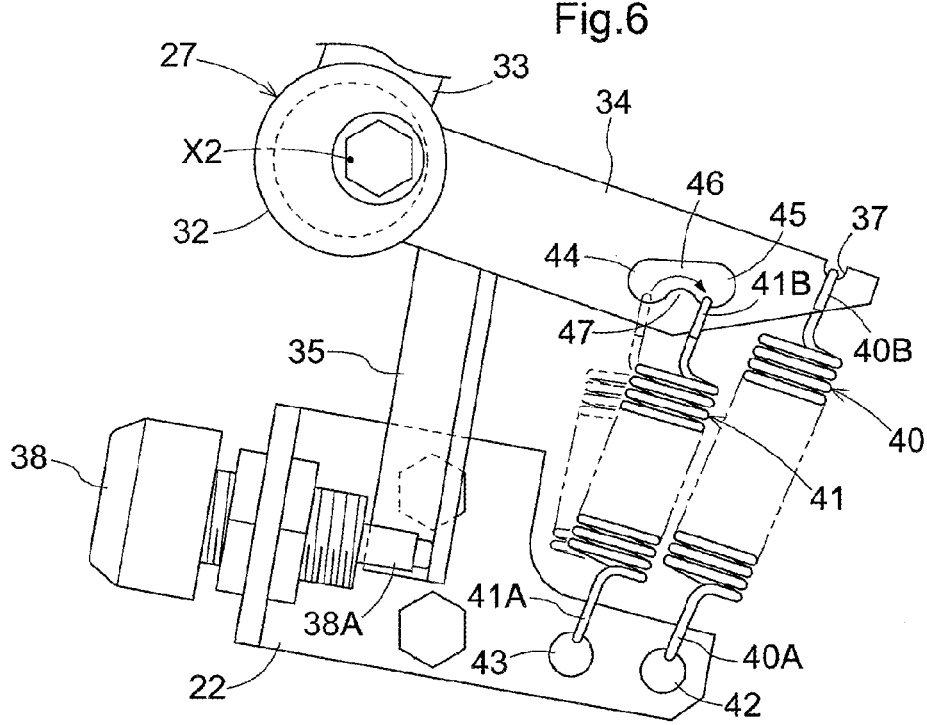
FIG. 6 shows the first embodiment, and is a right side view showing a shifting of the attachment position of a variable spring.
Figure 7:
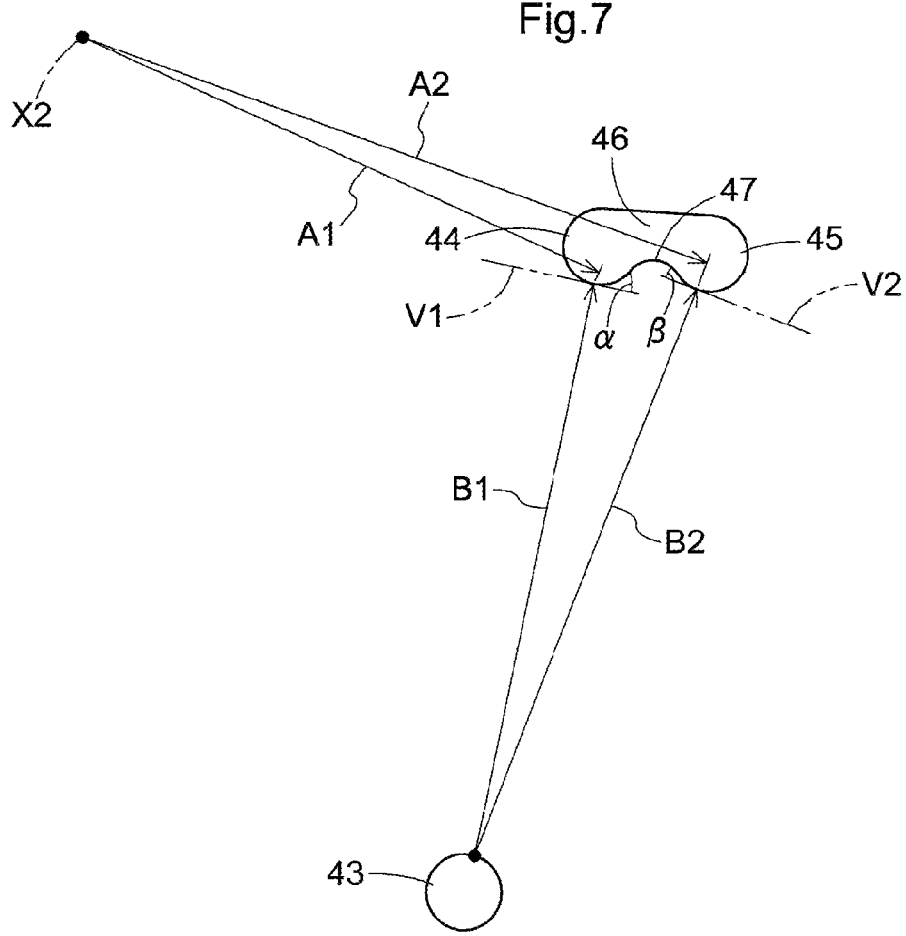
FIG. 7 shows the first embodiment, and is a diagram illustrating the positions of attachment holes as viewed from the right side.

As shown in FIGS. 6 and 7, the positions of the first attachment hole 44 and the second attachment hole 45 are set such that the distances thereof from the pivot axis X2 of the rocking shaft 32 are different from each other. That is to say, the positions of the first attachment hole 44 and the second attachment hole 45 are set such that the distance A1 between the first attachment hole 44 and the pivot axis X2 is larger than the distance A2 between the second attachment hole 45 and the pivot axis X2.

As shown in FIGS. 6 and 7, the first end 41A of the variable spring 41 on the side opposite to the second end 41B is attached to the second fixation hole 43 such that its position can be fixed. The positions of the first attachment hole 44 and the second attachment hole 45 are set such that the distances thereof from the second fixation hole 43 are different from each other. That is to say, the positions of the first attachment hole 44 and the second attachment hole 45 are set such that the distance B1 between the first attachment hole 44 and the second fixation hole 43 is larger than the distance B2 between the second attachment hole 45 and the second fixation hole 43.

As shown in FIG. 6, the second end 41B of the variable spring 41 is moved so as to shift between the first attachment hole 44 and the second attachment hole 45 along an edge portion of the variable spring 41 on a compressing direction side, the attachment hole to which the variable spring 41 is attached can thereby be changed, and the biasing force exerted on the pivot arm 27 from the variable spring 41 can be changed. That is to say, the neutral biasing mechanism 25 can change the biasing force of the variable spring 41 whose spring constant is relatively smaller than the first non-variable spring 40.

The pulling force exerted on the main arm portion 34 of the pivot arm 27 from the variable spring 41 attached to the second attachment hole 45 is larger than the pulling force exerted on the main arm portion 34 of the pivot arm 27 from the variable spring 41 attached to the first attachment hole 44.

That is to say, the positions of the first attachment hole 44 and the second attachment hole 45 are set based on the biasing force of the variable spring 41 such that moments exerted on the pivot arm 27 are different, in a state where the variable spring 41 is attached.

That is to say, the neutral biasing mechanism 25 is configured such that the biasing force of the variable spring 41 among the two springs, namely the first non-variable spring 40 and the variable spring 41, can be changed.

As shown in FIG. 6, the first attachment hole 44 and the second attachment hole 45 are in communication with each other through a communication portion 46 formed between the first attachment hole 44 and the second attachment hole 45. That is to say, the first attachment hole 44 and the second attachment hole 45 are in communication with each other to form a single hole portion. The first attachment hole 44 and the second attachment hole 45 are in communication with each other such that the second end 41B of the variable spring 41 can move therein.

An edge portion of the communication portion 46, which causes the first attachment hole 44 and the second attachment hole 45 that are two adjoining attachment holes to be in communication with each other, on the compressing direction side of the variable spring 41 is provided with a projecting portion 47 (an example of a "holding means") that projects toward the extending direction of the variable spring 41. The projecting portion 47 has a substantially arc shape. With the projecting portion 47, the second end 41B of the variable spring 41 is held by each of the first attachment hole 44 and the second attachment hole 45. The first attachment hole 44 and the second attachment hole 45 are continuous with the projecting portion 47 while forming a smooth curve.

As shown in FIGS. 6 and 7, the projecting portion 47 includes a first inclined face 47A on the first attachment hole 44 side and a second inclined face 47B on the second attachment hole 45 side. An angle α formed between the first inclined face 47A and a virtual line V1 orthogonal to the extending and contracting direction of the first non-variable spring 40 attached to the first attachment hole 44 is larger than the angle β formed between the second inclined face 47B and a virtual line V2 orthogonal to the extending and contracting direction of the first non-variable spring 40 attached to the second attachment hole 45. That is to say, the inclination angle of the first inclined face 47A is steeper than the inclination angle of the second inclined face 47B. In other words, the inclination angle of the second inclined face 47B is gentler than the inclination angle of the first inclined face 47A.

In a state where the variable spring 41 is attached to the first attachment hole 44, if the biasing force of the neutral biasing mechanism 25 becomes smaller than the force necessary for restoring the swash plate 23 to the neutral position N1, the attachment position of the variable spring 41 is shifted from the first attachment hole 44 to the second attachment hole 45 across the projecting portion 47, and it is thereby possible to increase the biasing force of the neutral biasing mechanism 25 and performs adjustment such that the swash plate 23 is reliably restored to the neutral position N1.

By thus performing only an operation of shifting the attachment position of the variable spring 41 between the first attachment hole 44 and the second attachment hole 45, the biasing force of the neutral biasing mechanism 25 can be easily adjusted.

[Regarding Gear Shift Pedal]

As shown in FIGS. 3 to 5, the operation arm 26B of the cam member 26 is associated with the gear shift pedal 31 via the association mechanism 30. The gear shift pedal 31 is arranged in a right side portion of the body of the boarding/driving section 11. That is to say, the gear shift pedal 31 is arranged on the same side as the neutral biasing mechanism 25 in a body left-right direction with respect to the transmission case 13. The gear shift pedal 31 includes a front stepping operation portion 31A for forward gear change, a rear stepping operation portion 31B for rearward gear change that is integrated with the front stepping operation portion 31A, and a pedal arm 31C integrated with the front stepping operation portion 31A and the rear stepping operation portion 31B.

The gear shift pedal 31 is configured to rock like a scale around a support axis X3 of a spindle 48 that is connected to a lower end portion of the pedal arm 31C and is oriented laterally with respect to the body, as a result of receiving an action of a stepping operation on the front stepping operation portion 31A or the rear stepping operation portion 31B and the biasing force of the neutral biasing mechanism 25.

The association mechanism 30 includes a first connecting pin 49 that is oriented to the left and right with respect to the body, an association arm 50 extending in a body front-rear direction, and a second connecting pin 51 that is oriented to the left and right with respect to the body. The first connecting pin 49 pivotably connects the pedal arm 31C of the gear shift pedal 31 to one end portion of the association arm 50. The second connecting pin 51 pivotably connects the other end portion of the association arm 50 to a free end of the operation arm 26B of the cam member 26.

The gear shift pedal 31 is configured to rock like a scale around the support axis X3 between a maximum forward angle F3 (see FIG. 4) and a maximum rearward angle R3 (see FIG. 5), with a neutral angle N3 (see FIG. 3) therebetween. The swash plate 23 is set at the neutral position N1 by setting the gear shift pedal 31 at the neutral angle N3 (see FIG. 3), the swash plate 23 is set at the maximum forward rotation position F1 by setting the gear shift pedal 31 at the maximum forward angle F3 (see FIG. 4), and the swash plate 23 is set at the maximum reverse rotation position R1 by setting the gear shift pedal 31 at the maximum rearward angle R3 (see FIG. 5).

As shown in FIGS. 3 and 4, by performing an operation of stepping the front stepping operation portion 31A of the gear shift pedal 31 against the biasing force of the neutral biasing mechanism 25, the gear shift pedal 31 is rocked toward the maximum forward angle F3 side from the neutral angle N3, and the angle of the swash plate 23 is thereby changed from the neutral position N1 to the maximum forward rotation position F1. Also, as shown in FIGS. 3 and 5, by performing an operation of stepping the rear stepping operation portion 31B of the gear shift pedal 31 against the biasing force of the neutral biasing mechanism 25, the gear shift pedal 31 is rocked toward the maximum rearward angle R3 side from the neutral angle N3, and the angle of the swash plate 23 is thereby changed from the neutral position N1 to the maximum reverse rotation position R1. Upon separating the foot from the gear shift pedal 31, the gear shift pedal 31 is automatically restored to the neutral angle N3, and the swash plate 23 is automatically restored to the neutral position N1 (see FIG. 3) due to the action of the biasing force of the neutral biasing mechanism 25.

[Regarding Combination of Biasing Forces of First Non-Variable Spring and Biasing Force of Variable Spring]

Although not particularly shown in the diagrams, in some conventional neutral biasing mechanisms such as one disclosed in JP 2011-152823A mentioned above, the biasing force for restoring the swash plate to the neutral position is applied by only a single spring. In the conventional neutral biasing mechanisms, a single spring having a relatively large spring constant is used in order to apply reliable biasing force for restoring the swash plate to the neutral position, even in a state where the swash plate is near the neutral position. However, in the case of using only such a single spring, since the spring constant is large, the difference between the biasing force of the neutral biasing mechanism when the swash plate is at the neutral position and the biasing force of the neutral biasing mechanism when the swash plate is at the maximum forward rotation position or the maximum reverse rotation position is too large. That is to say, excessively large operation force is required when stepping the gear shift pedal 31 to the maximum forward angle or the maximum rearward angle.

In contrast, in the neutral biasing mechanism 25 in the first embodiment, the biasing force of the first non-variable spring 40 and the biasing force of the variable spring 41 whose spring constant is smaller than that of the first non-variable spring 40 are combined to obtain the biasing force for restoring the swash plate 23 to the neutral position N1, as shown in FIGS. 3 to 7. Thus, since two springs 40 and 41 having different biasing forces are used, the difference between the biasing force of the neutral biasing mechanism 25 when the swash plate 23 is at the neutral position N1 and the biasing force of the neutral biasing mechanism 25 when the swash plate 23 is at the maximum forward rotation position F1 or the maximum reverse rotation position R1 can be made small. That is to say, since the neutral biasing mechanism 25 in the first embodiment uses two springs 40 and 41 having different spring constants, the neutral biasing mechanism 25 is advantageous in that the biasing force necessary for restoring the swash plate 23 to the neutral position N1 can be sufficiently secured, and furthermore, the biasing force at the time when the swash plate 23 is at the maximum forward rotation position F1 or the maximum reverse rotation position R1 can be made small, as compared with the conventional neutral biasing mechanisms that use only a single spring having a large spring constant or use two springs having the same spring constant. It is thereby possible to apply the biasing force for reliably restoring the swash plate 23 to the neutral position N1 when the swash plate 23 is near the neutral position N1, and to suppress the operation force when stepping the gear shift pedal 31 to the maximum forward angle F3 or the maximum rearward angle R3 for changing the position of the swash plate 23 to the maximum forward rotation position F1 or the maximum reverse rotation position T1, and the operability can be improved.

Second Embodiment

A second embodiment, which is an example of the present invention, will now be described based on the drawings. The second embodiment is similar to the first embodiment, except the content described below. A description of a part of the second embodiment similar to the first embodiment will be omitted.

[Regarding First Non-Variable Spring, Variable Spring, and Second Non-Variable Spring]

As shown in FIGS. 8 to 11, the neutral biasing mechanism 25 in the second embodiment includes three springs as a plurality of springs, namely a first non-variable spring 40 (an example of "other springs") configured such that the biasing force thereof cannot be changed, a variable spring 41 serving as an adjustment spring configured such that the biasing force thereof can be changed, and a second non-variable spring 60 (an example of "other springs") configured such that the biasing force thereof cannot be changed. That is to say, the neutral biasing mechanism 25 in the second embodiment includes two (a plurality of) "other springs" that are different from the "variable spring". Note that the total of the biasing force of the first non-variable spring 40, the biasing force of the variable spring 41, and the biasing force of the second non-variable spring 60 in the second embodiment is substantially equal to the total of the biasing force of the first non-variable spring 40 and the biasing force of the variable spring 41 in the first embodiment.

The spring constant of the variable spring 41 is set smaller than the spring constant of the first non-variable spring 40 and the spring constant of the second non-variable spring 40. That is to say, the biasing force of the variable spring 41 to be applied to the pivot arm 27 is set smaller than the biasing force of the first non-variable spring 40 to be applied to the pivot arm 27. Also, the biasing force of the variable spring 41 to be applied to the pivot arm 27 is set smaller than the biasing force of the second non-variable spring 60 to be applied to the pivot arm 27. That is to say, the biasing force of the variable spring 41 to be applied to the pivot arm 27 is set smaller than the total of the biasing force of the first non-variable spring 40 to be applied to the pivot arm 27 and the biasing force of the second non-variable spring 60 to be applied to the pivot arm 27.

The first non-variable spring 40, the variable spring 41, and the second non-variable spring 60 are attached so as to be spanned from the pivot arm 27 to the base 20, and are configured to bias the pivot arm 27 such that the roller 28 is fitted into the cam portion 29 of the cam member 26. More specifically, the first non-variable spring 40, the variable spring 41, and the second non-variable spring 60 are configured such that the roller 28 presses the cam portion 29 of the cam member 26 and applies the biasing force for biasing the pivot arm 27 in a direction in which the swash plate 23 is set at the neutral position N1. That is to say, the biasing force with which the neutral biasing mechanism 25 biases the swash plate 23 to the neutral position N1 is based on a combination of the biasing force of the first non-variable spring 40, the biasing force of the variable spring 41, and the biasing force of the second non-variable spring 60.

Figure 8:
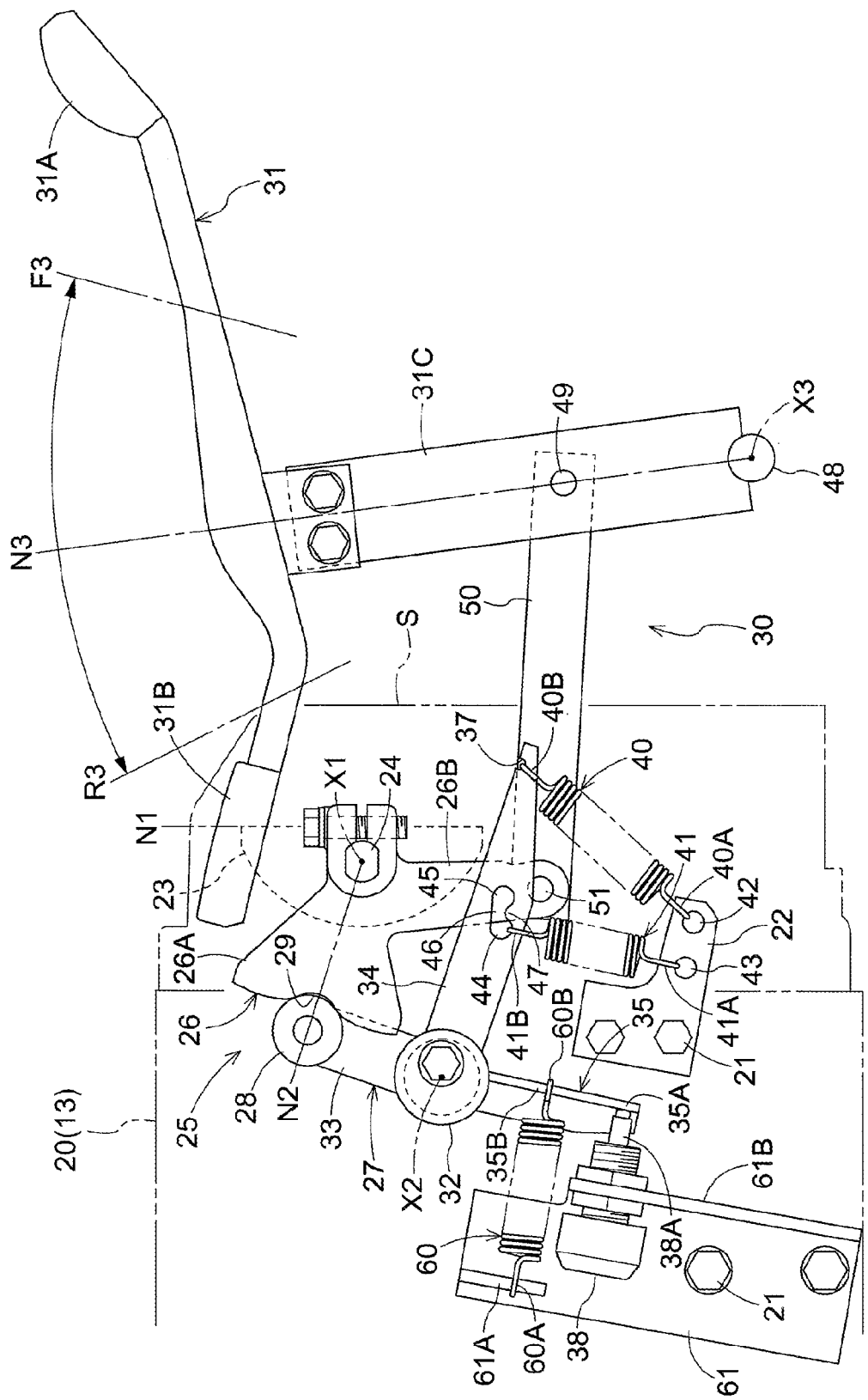
FIG. 8 shows a second embodiment, and is a right side view showing the periphery of a neutral biasing mechanism in a state where a swash plate is at a neutral position.
Figure 9:
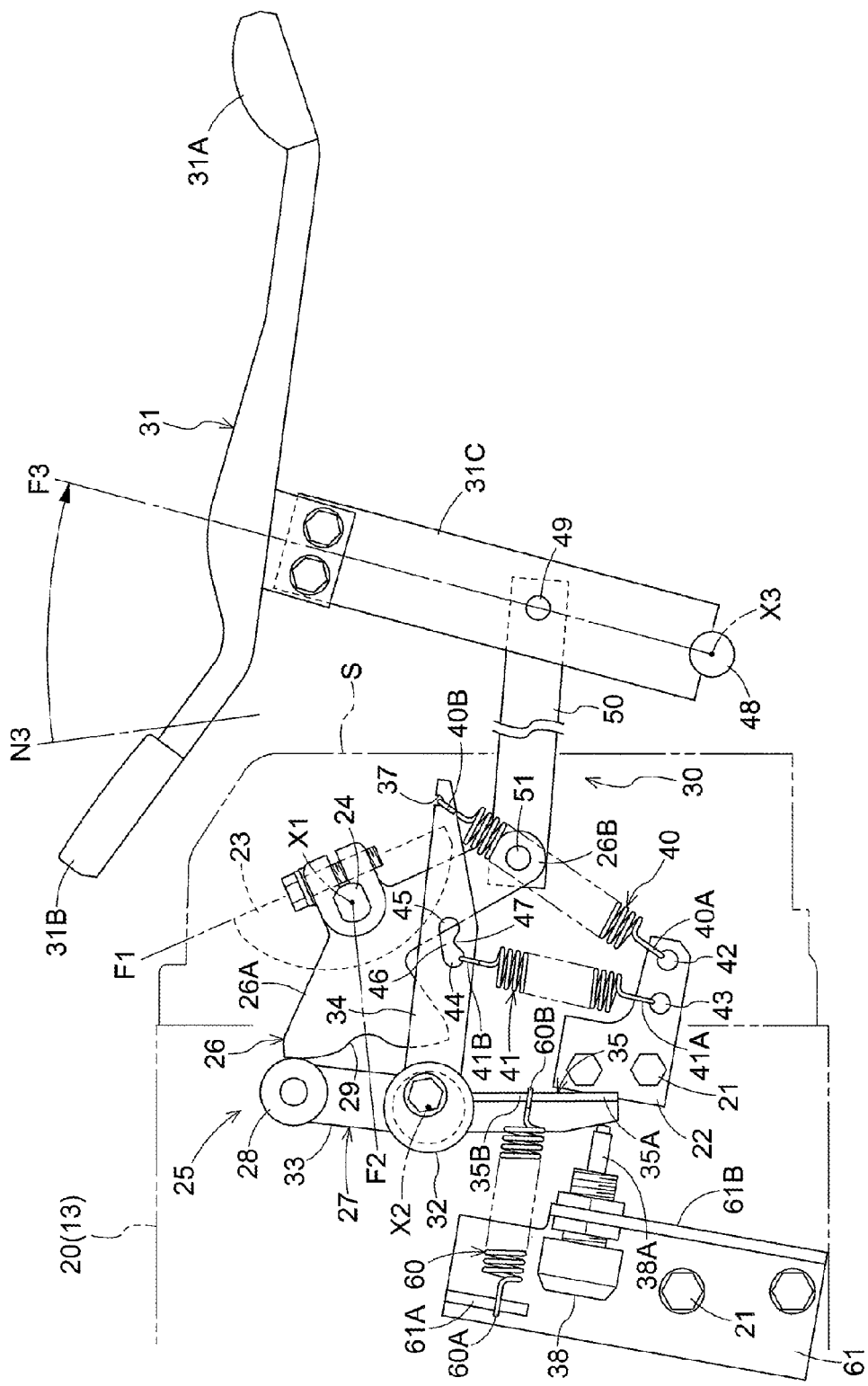
FIG. 9 shows the second embodiment, and is a right side view showing the periphery of the neutral biasing mechanism in a state where the swash plate is at a maximum forward rotation position.
Figure 10:
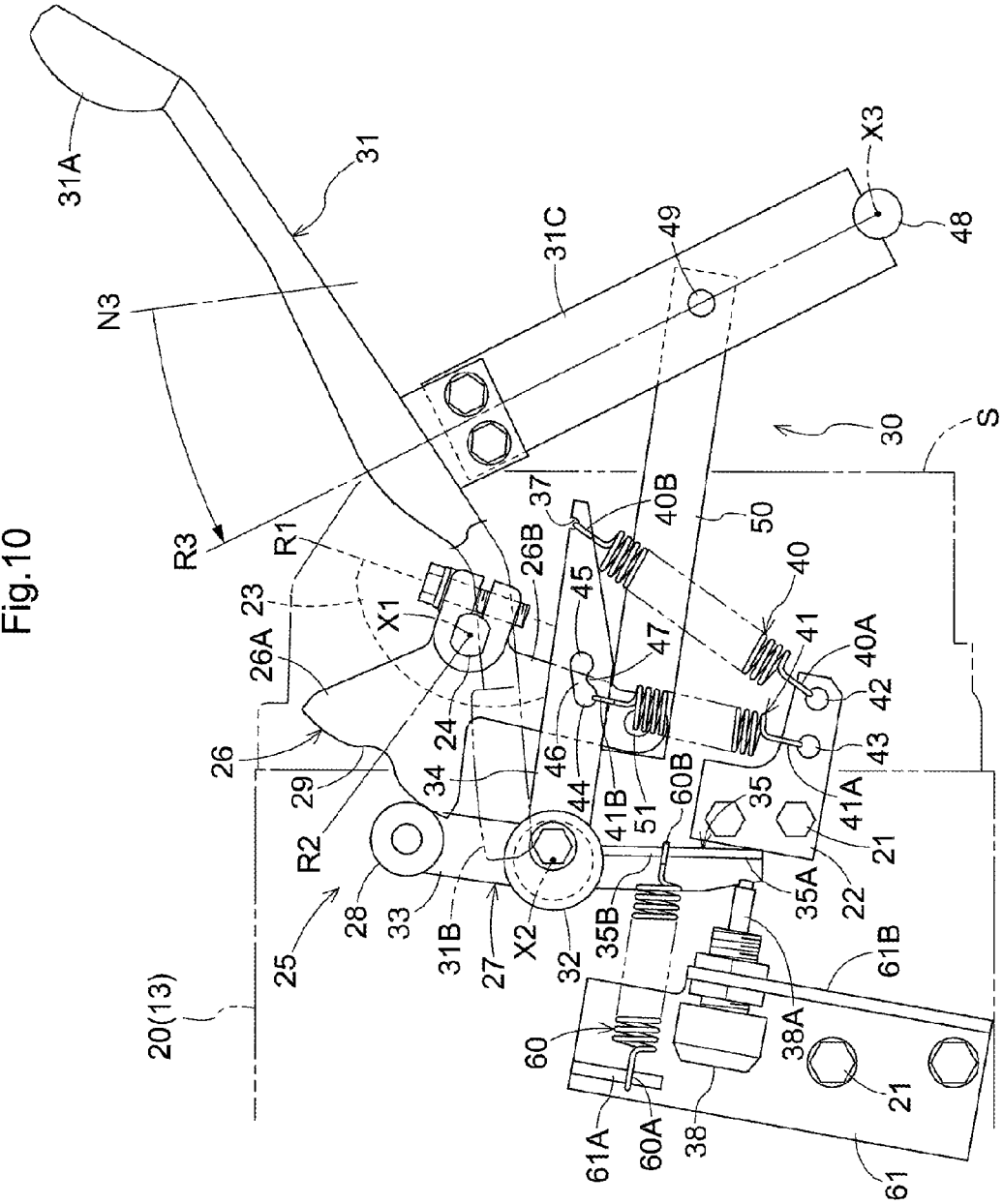
FIG. 10 shows the second embodiment, and is a right side view showing the periphery of the neutral biasing mechanism in a state where the swash plate is at a maximum reverse rotation position.

As shown in FIGS. 8 to 10, the first non-variable spring 40, the second non-variable spring 60, and the variable spring 41 are arranged at separate positions in a state where the attachment positions thereof in the pivot arm 27 and the base 20 are separate from one another. That is to say, the first non-variable spring 40, the second non-variable spring 60, and the variable spring 41 are provided independently in a state where the attachment positions thereof in the pivot arm 27 and the base 20 are separate from one another. The first non-variable spring 40 and the variable spring 41 are attached so as to be spanned from the main arm portion 34 of the pivot arm 27 to the fixation bracket 22. The second non-variable spring 60 is attached so as to be spanned from the sub-arm portion 35 of the pivot arm 27 to an attachment bracket 61.

The first non-variable spring 40 and the variable spring 41 exert pulling force on the main arm portion 34 of the pivot arm 27, and the second non-variable spring 60 exerts pulling force on the sub-arm portion 35 of the pivot arm 27. The pivot arm 27 is thereby biased such that the roller 28 rotatably supported by the exertion arm portion 33 of the pivot arm 27 is fitted into the cam portion 29.

The first non-variable spring 40, the variable spring 41, and the second non-variable spring 60 are tensile springs. The first non-variable spring 40, the variable spring 41, and the second non-variable spring 60 contract to the maximum when the swash plate 23 is at the neutral position N1 (see FIG. 8), and extend to the maximum when the swash plate 23 is at the maximum forward rotation position F1 or the maximum reverse rotation position R1 (see FIGS. 9 and 10). The first non-variable spring 40, the variable spring 41, and the second non-variable spring 60 exert the pulling force on the pivot arm 27 even in a state where the swash plate 23 is at the neutral position N1. More specifically, in a state where the cam member 26 is set at the neutral posture N2, the first non-variable spring 40, the variable spring 41, and the second non-variable spring 60 are attached to the pivot arm 27 in a state of being extended to a length larger than their natural lengths.

As shown in FIGS. 8 to 10, the base 20 includes the fixation bracket 22 to which the first non-variable spring 40 and the variable spring 41 are attached, and the attachment bracket 61 to which the second non-variable spring 60 is attached. The fixation bracket 22 is supported by the right side portion of the body of the base 20 while being fixed thereto by a fastening tool such as the bolt 21. The attachment bracket 61 is located on the rear side of the fixation bracket 22, and is supported by the right side portion of the body of the base 20 while being fixed thereto by a fastening tool such as the bolt 21.

The first non-variable spring 40 and the variable spring 41 are attached so as to be spanned from the main arm portion 34 of the pivot arm 27 to the base 20. The first non-variable spring 40 and the variable spring 41 are attached to the base 20 via the common fixation bracket 22. The second non-variable spring 60 is attached so as to be spanned from the sub-arm portion 35 of the pivot arm 27 to the base 20. The second non-variable spring 60 is attached to the base 20 via the attachment bracket 61.

The main arm portion 34 of the pivot arm 27 includes a hooking portion 37 having a cutout shape. The hooking portion 37 is a cutout portion formed by cutting out downward an upper edge portion of the main arm portion 34 on the free end side. The second end 40B of the first non-variable spring 40 is attached to the hooking portion 37 of the main arm portion 34 in a fixable state.

In the second embodiment, as shown in FIGS. 8 to 11, the sub-arm portion 35 extends downward from a lower end portion of the rocking shaft 32. In the second embodiment, the main arm portion 34 is formed longer than in the first embodiment. Furthermore, in the second embodiment, the hooking portion 37 serving as an attachment position of the first non-variable spring 40 is greatly separate from the first and second attachment holes 44 and 45 serving as the attachment positions of the variable spring 41. The first and second attachment portions 35B and 61A serving as the attachment positions of the second non-variable spring 60 is greatly separate from the first and second attachment holes 44 and 45 and the second fixation hole 43 serving as the attachment positions of the variable spring 41.

In the second embodiment, as shown in FIGS. 8 to 11, the switch 38 is attached to the attachment bracket 61 fixed to the base 20 at a position separate from the fixation bracket 22. The switch 38 is attached to a support portion 61B, which is a portion of the attachment bracket 61 that is bent in an L-shape, the portion being parallel with the pivot axis X2. The attachment bracket 61 is fixed to the base 20 by a bolt or the like. The switch 38 outputs a detection signal when the detector 38A is pressed in a pressing direction parallel with a pressure axis C4.

The sub-arm portion 35 of the pivot arm 27 includes a detecting portion 35A that serves as a detection target of the switch 38. The detecting portion 35A is formed at a portion of the L-shaped sub-arm portion 35 along the direction of the pivot axis X2. The detecting portion 35A is in a state of facing the switch 38. Upon the cam member 26 being set at the neutral posture N2, the swash plate 23 is set at the neutral position N1, and the detector 38A of the switch 38 is pressed by the detecting portion 35A of the sub-arm portion 35. A detection signal indicating that the swash plate 23 is at the neutral position N1 is thereby output from the switch 38. The detection signal of the switch 38 is input to a control device (not shown), and is used in various kinds of control.

Figure 11:
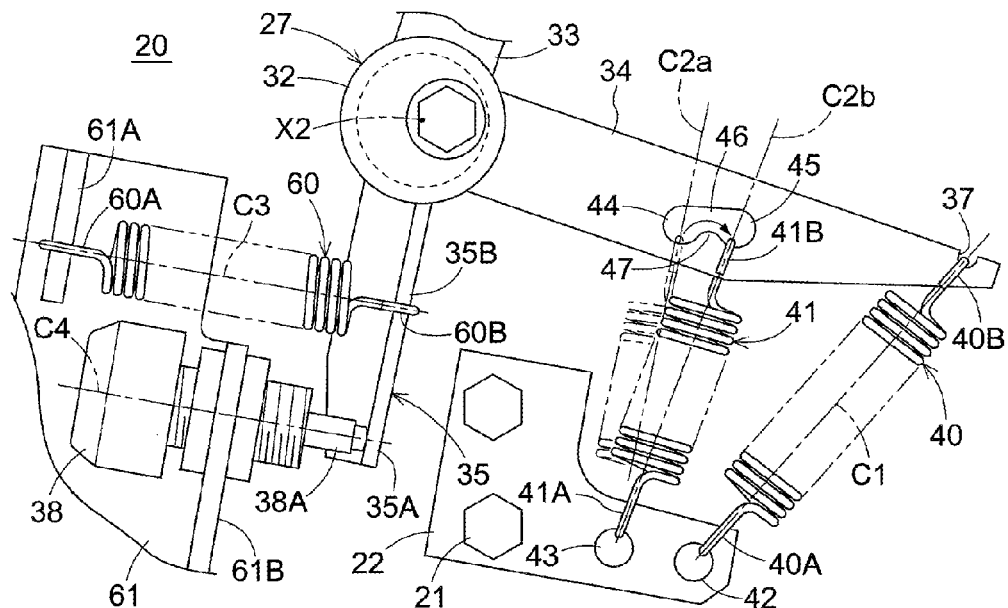
FIG. 11 shows the second embodiment, and is a right side view showing a shifting of the attachment position of a variable spring.

The sub-arm portion 35 of the pivot arm 27 includes a first attachment portion 35B. The first attachment portion 35B is located on the upper side of the detecting portion 35A. The attachment bracket 61 includes a second attachment portion 61A. The second attachment portion 61A is located on the rear side of the support portion 61B and on the upper side of the switch 38. The first attachment portion 35B and the second attachment portion 61A are attachment positions to which the second non-variable spring 60 can be attached. A first end 60A of the second non-variable spring 60 is attached to the second attachment portion 61A of the attachment bracket 61. The second end 60B of the second non-variable spring 60 is attached to the first attachment portion 35B of the sub-arm portion 35 of the pivot arm 27. That is to say, the second non-variable spring 60 is attached near the detecting portion 35A of the sub-arm portion 35 of the pivot arm 27. Since the second non-variable spring 60 is located above the switch 38, the upper side of the switch 38 is protected by the second non-variable spring 60. The extending direction of the second non-variable spring 60 is parallel with the pressing direction of the switch 38. As shown in FIG. 11, in a state where the switch 38 is pressed by the detecting portion 35A of the sub-arm portion 35, a third spring axis C3, which is the center of the second non-variable spring 60, is set substantially parallel with a pressure axis C4 of the switch 38.

As shown in FIG. 11 and the like, the first non-variable spring 40 and the variable spring 41 are attached so as to extend in different directions. A first spring axis C1, which is the center of the first non-variable spring 40, greatly inclines with respect to a weak-side second spring axis C2a, which is the center of the variable spring 41 in a state of being attached to the first attachment hole 44. Also, the first spring axis C1, which is the center of the first non-variable spring 40, greatly inclines with respect to a strong-side second spring axis C2b, which is the center of the variable spring 41 in a state of being attached to the second attachment hole 45. More specifically, the first non-variable spring 40 and the variable spring 41 are attached so as to be more separate from each other as they approach the main arm portion 34 from the fixation bracket 22. For this reason, the variable spring 41 does not block the space surrounding the first attachment hole 44 and the second attachment hole 45. That is to say, the attachment position of a second end 41B of the variable spring 41 can be easily shifted between the first attachment hole 44 and the second attachment hole 45, while the variable spring 41 does not interfere with its periphery.

The variable spring 41 and the second non-variable spring 60 are attached so as to extend in different directions. The third spring axis C3, which is the center of the second non-variable spring 60, greatly inclines with respect to the weak-side second spring axis C2a, which is the center of the variable spring 41 in a state of being attached to the first attachment hole 44. Also, the third spring axis C3, which is the center of the second non-variable spring 60, greatly inclines with respect to the strong-side second spring axis C2b, which is the center of the variable spring 41 in a state of being attached to the second attachment hole 45. For this reason, the attachment position of the second end 41B of the variable spring 41 can be easily shifted between the first attachment hole 44 and the second attachment hole 45, while the second non-variable spring 60 does not interfere with its periphery.

The variable spring 41 is located at a position closer to the rocking shaft 32 (pivot axis X2) than the first non-variable spring 40 is. The second non-variable spring 60 is located at a position greatly separate from the first non-variable spring 40 and the variable spring 41, and is attached near the detecting portion 35A of the sub-arm portion 35 of the pivot arm 27. More specifically, the second non-variable spring 60 is located on the side opposite to the first non-variable spring 40 and the variable spring 41 across the sub-arm portion 35 of the pivot arm 27. For this reason, a relatively large space is secured around the attachment position of the second non-variable spring 60, and a second non-variable spring 60 having a large dimension can be easily arranged.

[Regarding Combination of Biasing Forces of First Non-Variable Spring, Variable Spring, and Second Non-Variable Spring]

As shown in FIGS. 8 to 11, the neutral biasing mechanism 25 in the second embodiment combines the biasing force of the first non-variable spring 40, the biasing force of the variable spring 41 whose spring constant is smaller than that of the first non-variable spring 40, and the biasing force of the second non-variable spring 60 whose spring constant is larger than that of the first non-variable spring 40, to obtain the biasing force for restoring the swash plate 23 to the neutral position N1. Thus, since three springs 40, 41, and 60 having different biasing forces are used, the difference between the biasing force of the neutral biasing mechanism 25 when the swash plate 23 is at the neutral position N1 and the biasing force of the neutral biasing mechanism 25 when the swash plate 23 is at the maximum forward rotation position F1 or the maximum reverse rotation position R1 can be made small. That is to say, since the neutral biasing mechanism 25 in the second embodiment uses three springs 40, 41, and 60 having different spring constants, the neutral biasing mechanism 25 is advantageous in that the biasing force necessary for restoring the swash plate 23 to the neutral position N1 can be sufficiently secured, and furthermore, the biasing force at the time when the swash plate 23 is at the maximum forward rotation position F1 or the maximum reverse rotation position R1 can be made small, as compared with the conventional neutral biasing mechanisms that use only a single spring having a large spring constant. It is thereby possible to apply the biasing force for reliably restoring the swash plate 23 to the neutral position N1 when the swash plate 23 is near the neutral position N1, and to suppress the operation force when stepping the gear shift pedal 31 to the maximum forward angle F3 or the maximum rearward angle R3 for changing the position of the swash plate 23 to the maximum forward rotation position F1 or the maximum reverse rotation position T1, and the operability can be improved.

Furthermore, the second embodiment has a structure in which the neutral biasing mechanism 25 distributes the load of generating the biasing force to the first non-variable spring 40, the variable spring 41, and the second non-variable spring 60, and accordingly the stress applied on fragile portions at which the curvature is maximum can be reduced in the first non-variable spring 40, the variable spring 41, and the second non-variable spring 60. With this configuration, the fragile portions of the first non-variable spring 40, the variable spring 41, and the second non-variable spring 60 is unlikely to be broken after being used repeatedly. For this reason, the neutral biasing mechanism 25 having an excellent durability can be configured.

Other Embodiments

Other embodiments of the present invention will be described below. In the other embodiments below, configurations other than configurations described below are similar to the first embodiment or the second embodiment. The first embodiment, the second embodiment, and the other embodiments can be combined unless a contradiction occurs. Note that the scope of the present invention is not limited to the first embodiment, the second embodiment, or the other embodiments.

Figure 12:
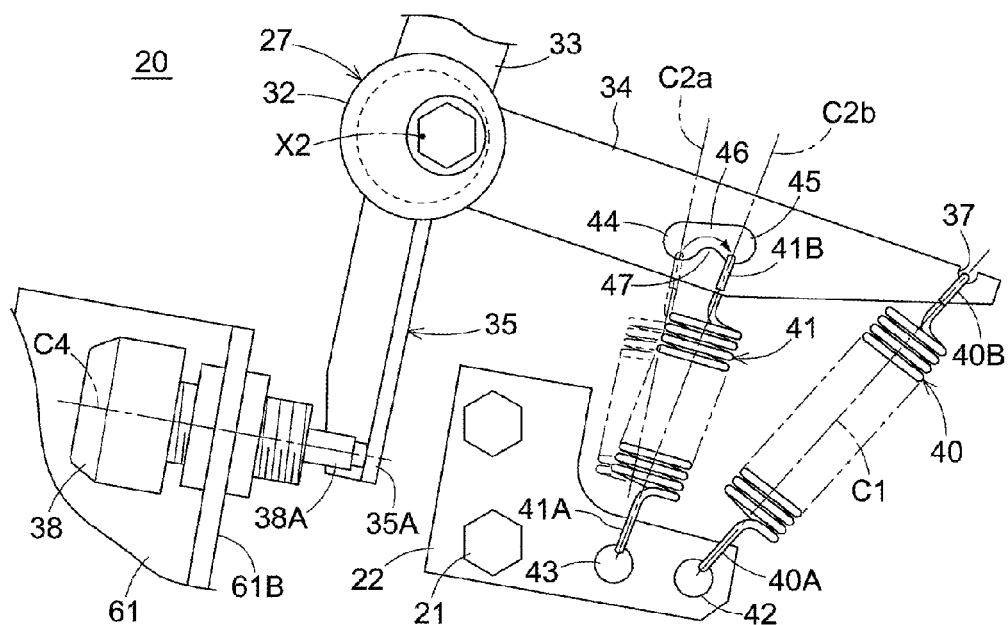
FIG. 12 shows another embodiment, and is a right side view showing a main part of a neutral biasing mechanism.

(1) Although the second embodiment describes an example in which the second non-variable spring 60 is provided, the present invention is not limited thereto. For example, as shown in FIG. 12, the second non-variable spring 60 may be omitted. That is to say, in this case, only one spring, namely the first non-variable spring 40 is provided as "another spring". The biasing force of the variable spring 41 to be applied to the pivot arm 27 is set smaller than the biasing force of the second non-variable spring 60 to be applied to the pivot arm 27. In the embodiment shown in FIG. 12, the first spring axis C1 of the first non-variable spring 40 greatly inclines with respect to the second spring axes C2a and C2b of the variable spring 41, unlike in the first embodiment. In this case, in order to compensate the biasing force of the omitted second non-variable spring 60, a configuration is employed in which the biasing forces of the first non-variable spring 40 and the variable spring 41 to be applied to the pivot arm 27 are larger than those of the first non-variable spring 40 and the variable spring 41 in the second embodiment.

Figure 13:
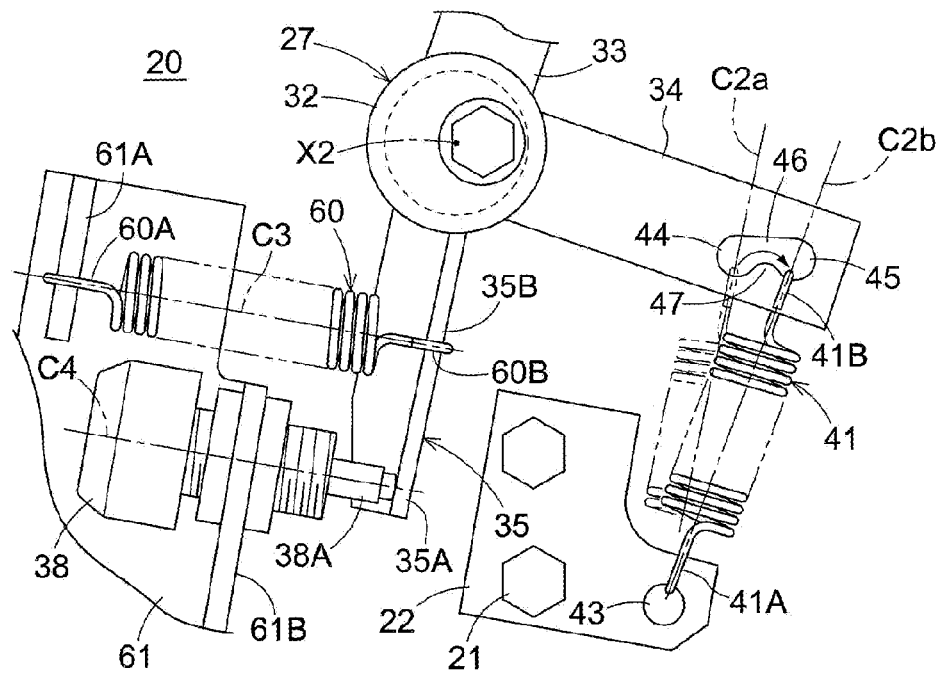
FIG. 13 shows another embodiment, and is a right side view showing a main part of a neutral biasing mechanism.

(2) Although the second embodiment describes an example in which the first non-variable spring 40 is provided, the present invention is not limited thereto. For example, as shown in FIG. 13, the first non-variable spring 40 may be omitted. That is to say, in this case, only one spring, namely the second non-variable spring 60 is provided as "another spring". The biasing force of the variable spring 41 to be applied to the pivot arm 27 is set smaller than the biasing force of the second non-variable spring 60 to be applied to the pivot arm 27. The extending directions of the variable spring 41 and the second non-variable spring 60 are configured to be substantially orthogonal to each other. In this case, the total of the biasing force of the variable spring 41 and the biasing force of the second non-variable spring 60 is adjusted so as to be substantially equal to the total of the biasing force of the first non-variable spring 40, the biasing force of the variable spring 41, and the biasing force of the second non-variable spring 60 in the second embodiment.

Figure 14:
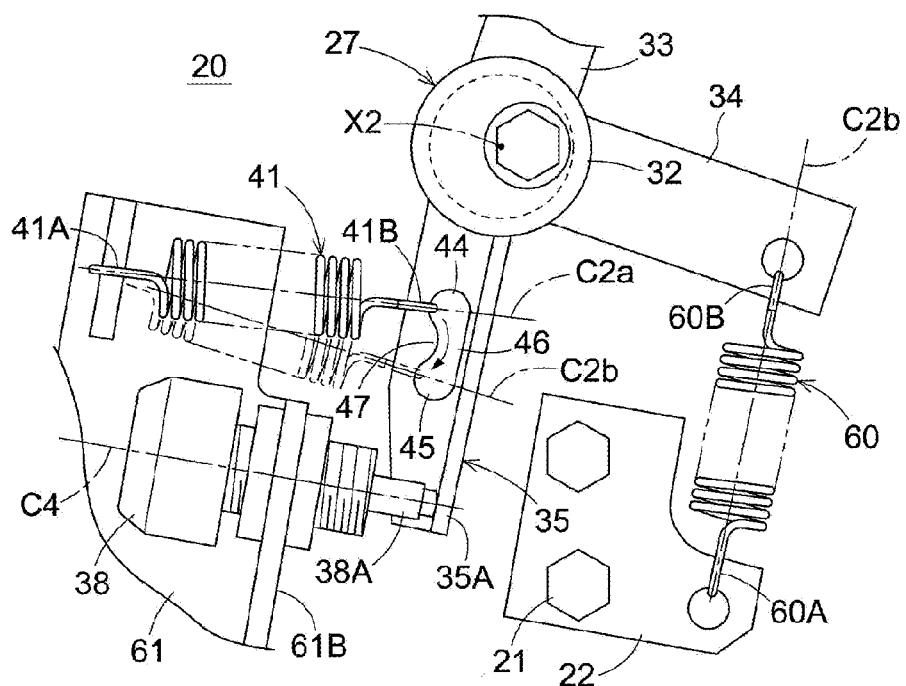
FIG. 14 shows another embodiment, and is a right side view showing a main part of a neutral biasing mechanism.

(3) Although the first embodiment describes an example in which the variable spring 41 is attached to the main arm portion 34 and the first non-variable spring 40 is attached to the sub-arm portion 35, the present invention is not limited thereto. For example, as shown in FIG. 14, the variable spring 41 may be attached to the sub-arm portion 35, and the first non-variable spring 40 may be attached to the main arm portion 34.

That is to say, the variable spring 41 may be attached to either one of the main arm portion 34 and the sub-arm portion 35, and the first non-variable spring 40 may be attached to the other one of the main arm portion 34 and the sub-arm portion 35.

Figure 15:
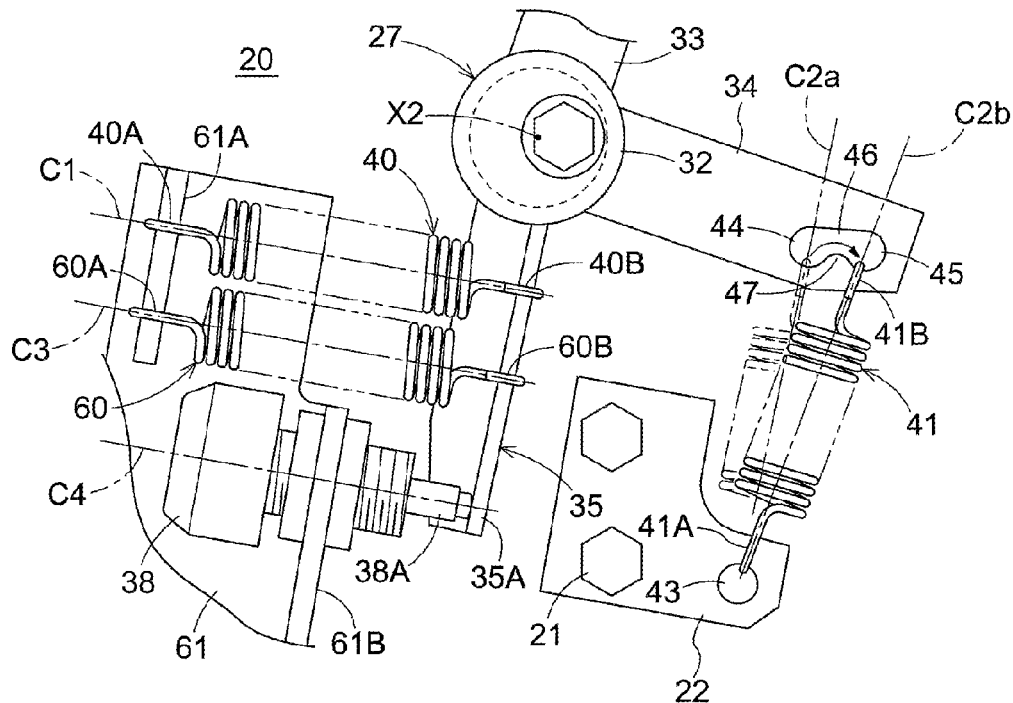
FIG. 15 shows another embodiment, and is a right side view showing a main part of a neutral biasing mechanism.

(4) Although the second embodiment describes an example in which the variable spring 41 is attached so as to be spanned from the main arm portion 34 of the pivot arm 27 to the base 20 (fixation bracket 22), the present invention is not limited thereto. For example, the attachment position of the variable spring 41 may be changed, and as shown in FIG. 15, the variable spring 41 may be attached so as to be spanned from the sub-arm portion 35 of the pivot arm 27 to the base 20 (attachment bracket 61). In this case, "a plurality of attachment holes" to which the variable spring 41, which is the "variable spring", is selectively attached may be formed in the sub-arm portion 35 of the pivot arm 27. In this case, a configuration may also be employed in which the attachment position of the second non-variable spring 60 is changed, and the second non-variable spring 60 is attached so as to be spanned from the main arm portion 34 of the pivot arm 27 to the base 20 (fixation bracket 22). In this case, the biasing forces of the first non-variable spring 40, the variable spring 41, and the second non-variable spring 60 are appropriately adjusted such that the total of the biasing forces of the first non-variable spring 40, the variable spring 41, and the second non-variable spring 60 to be applied to the pivot arm 27 does not change.

Figure 16:
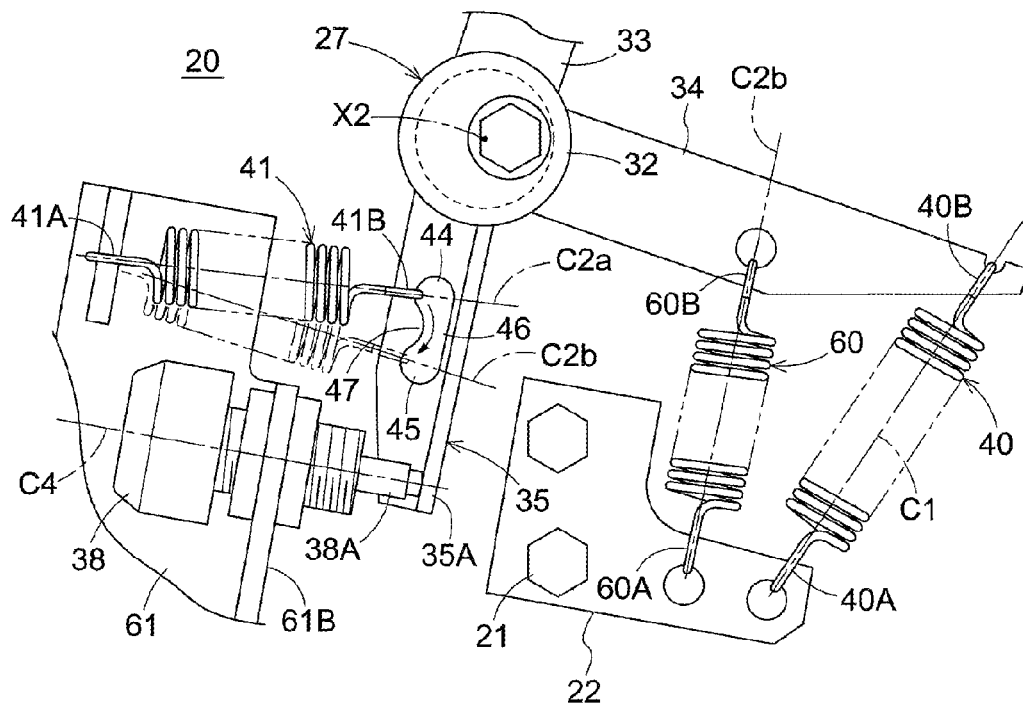
FIG. 16 shows another embodiment, and is a right side view showing a main part of a neutral biasing mechanism.

(5) Although the second embodiment describes an example in which the first non-variable spring 40 is attached so as to be spanned from the main arm portion 34 of the pivot arm 27 to the base 20 (fixation bracket 22), the present invention is not limited thereto. For example, the attachment position of the first non-variable spring 40 may be changed, and as shown in FIG. 16, the first non-variable spring 40 may be attached so as to be spanned from the sub-arm portion 35 of the pivot arm 27 to the base 20 (attachment bracket 61). In this case, the biasing forces of the first non-variable spring 40, the variable spring 41, and the second non-variable spring 60 are appropriately adjusted such that the total of the biasing forces of the first non-variable spring 40, the variable spring 41, and the second non-variable spring 60 to be applied to the pivot arm 27 does not change.

That is to say, a configuration is preferable in which the variable spring 41 is attached to either one of the main arm portion 34 and the sub-arm portion 35, and at least one of the "other springs" is attached to the other one of the main arm portion 34 and the sub-arm portion 35.

A configuration is also preferable in which the extending direction of the variable spring 41 is substantially orthogonal to the extending direction of at least one of the other springs attached to the other arm portion that is different from the arm portion to which the variable spring 41 is attached.

(6) Although the second embodiment describes an example in which the second non-variable spring 60 is attached so as to be spanned from the sub-arm portion 35 of the pivot arm 27 to the base 20 (attachment bracket 61), the present invention is not limited thereto. For example, the attachment position of the second non-variable spring 60 may be changed, and as shown in FIG. 17, the second non-variable spring 60 may be attached so as to be spanned from the main arm portion 34 of the pivot arm 27 to the base 20 (fixation bracket 22). In this case, the biasing forces of the first non-variable spring 40, the variable spring 41, and the second non-variable spring 60 are appropriately adjusted such that the total of the biasing forces of the first non-variable spring 40, the variable spring 41, and the second non-variable spring 60 to be applied to the pivot arm 27 does not change.

(7) Although the second embodiment describes an example in which two springs, namely the first non-variable spring 40 and the second non-variable spring 60 are provided as the "other springs", the present invention is not limited thereto. Three or more springs may be provided as the "other springs".

(8) Although the second embodiment describes an example in which the extending direction of the second non-variable spring 60 is parallel with the pressing direction of the switch 38, the present invention is not limited thereto. For example, the extending direction of the second non-variable spring 60 may be a direction other than the pressing direction of the switch 38.

(9) Although the second embodiment describes an example in which the biasing force of the second non-variable spring 60 to be applied to the pivot arm 27 is set larger than the biasing force of the first non-variable spring 40 to be applied to the pivot arm 27, the present invention is not limited thereto. For example, the biasing force of the first non-variable spring 40 to be applied to the pivot arm 27 may be set larger than the biasing force of the second non-variable spring 60 to be applied to the pivot arm 27.

(10) In the first and second embodiments, two attachment holes, namely the first attachment hole 44 and the second attachment hole 45 are formed as an example of "a plurality of attachment holes". However, the present invention is not limited thereto. For example, three or more attachment holes may be provided.

(11) Although the first and second embodiment describe an example in which the first attachment hole 44 and the second attachment hole 45 are in communication with each other through the communication portion 46, the present invention is not limited thereto. A configuration may be employed in which the first attachment hole 44 and the second attachment hole 45 are not in communication with each other, and are formed as hole portions independent from each other.

(12) Although the first and second embodiments describe an example of the arc-shaped projecting portion 47, the present invention is not limited thereto. For example, another projecting portion having a linear portion may be employed. In this case, the other projecting portion may have a shape such as a triangular shape or a trapezoidal shape.

(13) Although the first and second embodiments describe an example in which the first attachment hole 44 and the second attachment hole 45 are formed in the main arm portion 34 of the pivot arm 27, the present invention is not limited thereto. For example, the first attachment hole and the second attachment hole may be formed in the exertion arm portion 33 of the pivot arm 27 that supports the roller 28.

(14) Although the first and second embodiments describe an example in which "a plurality of attachment holes" to which the variable spring 41 is selectively attached are formed in the pivot arm 27, the present invention is not limited thereto. Instead, "a plurality of attachment holes" to which the variable spring 41, which is the "variable spring", is selectively attached may be formed in the fixation bracket 22 or the attachment bracket 61 on the base 20 side. In this case, a "fixing portion" to which the variable spring 41 is attached in a fixed manner is provided in the pivot arm 27. That is to say, it is preferable that a plurality of attachment holes 44 and 45 to which an end of the variable spring 41, the end serving as the attachment portion of the variable spring 41, is selectively attached are formed in either one of the pivot arm 27 and the base 20.

(15) Although the first embodiment describes an example in which the first non-variable spring 40 and the variable spring 41 are tensile springs, the present invention is not limited thereto. For example, the first non-variable spring 40 and the variable spring 41 each may be a tensile spring, a compression spring, a torsion spring, or the like.

(16) Although the second embodiment describes an example in which the first non-variable spring 40, the variable spring 41, and the second non-variable spring 60 are tensile springs, the present invention is not limited thereto. For example, the first non-variable spring 40, the variable spring 41, and the second non-variable spring 60 each may be selected from a tensile spring, a compression spring, a torsion spring, and the like.

(17) Although the first and second embodiments describe an example in which the gear shift pedal 31 is arranged on the same side as the neutral biasing mechanism 25 with respect to the transmission case 13 in the body left-right direction, the present invention is not limited thereto. The gear shift pedal 31 may be arranged on the side opposite to the neutral biasing mechanism 25 with respect to the transmission case 13 in the body left-right direction. In this case, the spindle of the association mechanism crosses the vicinity of the transmission case 13 in the body direction.

(18) Although the first and second embodiments describe the seesaw-type gear shift pedal 31 as an example of the gear change operation tool, the present invention is not limited thereto. For example, a gear change operation tool may be employed that has a forward pedal and a rearward pedal as separate members. Alternatively, for example, a gear change lever for manual operation may be provided as a gear change operation tool.

(19) Although the first and second embodiments describe an example of the base 20 attached to the right side portion side of the body of the transmission case 13 in a fixed manner, the present invention is not limited thereto. For example, other attachment members attached to the right side portion of the body of the hydrostatic continuously variable transmission S or the like in a fixed manner may be used as the "base".

(20) A structure is possible in which the "left" and "right" mentioned in the first and second embodiments are reversed.

(21) Although the above embodiments describe an example of using the hydrostatic continuously variable transmission S by incorporating it into a tractor, the present invention is not limited thereto. The hydrostatic continuously variable transmission S may be used by incorporating it into various working vehicles such as a rice planting machine, a mowing machine, and a construction machine.

What is claimed is:

1. A hydrostatic continuously variable transmission comprising:
    a neutral biasing mechanism that can change an angle of a swash plate by performing an operation of pivoting a trunnion shaft, and that biases the swash plate to a neutral position,
    the neutral biasing mechanism including:
    a cam member that is integrally attached to the trunnion shaft and has a cam portion formed so as to recede toward the trunnion shaft side;
    a pivot arm that pivots around a rocking shaft parallel with the trunnion shaft;
    a roller that is rotatably supported by the pivot arm, and pivots the cam member so as to be set at a neutral posture corresponding to the neutral position, by being fitted into the cam portion; and
    a plurality of springs that are attached so as to be spanned from the pivot arm to a common element of a base and bias the pivot arm such that the roller is fitted into the cam portion,
    wherein a variable spring configured such that a biasing force thereof can be changed and another spring that is different from the variable spring are provided as the plurality of springs, and
    wherein attachment positions of the variable spring and the other spring on the pivot arm and the common element of the base are separate from each other.

2. The hydrostatic continuously variable transmission according to claim 1,
    wherein only one spring is provided as the other spring, and
    wherein a biasing force of the variable spring to be applied to the pivot arm is set smaller than a biasing force of the other spring to be applied to the pivot arm.

3. The hydrostatic continuously variable transmission according to claim 1,
    wherein two or more springs are provided as the other spring, and
    wherein a biasing force of the variable spring to be applied to the pivot arm is set smaller than a total of biasing forces of the other springs to be applied to the pivot arm.

4. The hydrostatic continuously variable transmission according to claim 1,
    wherein a plurality of attachment holes to which an attachment portion of the variable spring is selectively attached is formed in one of the pivot arm and the common element of the base,
    wherein positions of the plurality of attachment holes are set such that, in a state where the attachment portion is attached thereto, moments exerted on the pivot arm based on the biasing force of the variable spring are different, and the plurality of attachment holes are in communication with each other such that the attachment portion can move therebetween, and
    wherein a holding means for holding the attachment portion at each of the attachment holes is provided.

* * * * *